United States Patent
Magness

(10) Patent No.: US 11,818,984 B2
(45) Date of Patent: Nov. 21, 2023

(54) MULTI-USE TRAILER

(71) Applicant: Magness Equipment, LLC, Elgin, OK (US)

(72) Inventor: John Magness, Elgin, OK (US)

(73) Assignee: Magness Equipment, LLC, Elgin, OK (US)

( * ) Notice: Subject to any disclaimer, the term of this patent is extended or adjusted under 35 U.S.C. 154(b) by 7 days.

(21) Appl. No.: 17/845,605

(22) Filed: Jun. 21, 2022

(65) Prior Publication Data

US 2022/0402419 A1 Dec. 22, 2022

Related U.S. Application Data

(60) Provisional application No. 63/213,038, filed on Jun. 21, 2021.

(51) Int. Cl.
| | |
|---|---|
| *A01D 90/08* | (2006.01) |
| *B60P 1/43* | (2006.01) |
| *B60P 1/16* | (2006.01) |
| *A01D 87/12* | (2006.01) |
| *B62D 53/06* | (2006.01) |

(52) U.S. Cl.
CPC ......... *A01D 90/083* (2013.01); *A01D 87/127* (2013.01); *B60P 1/165* (2013.01); *B60P 1/433* (2013.01); *B62D 53/067* (2013.01); *B60P 1/431* (2013.01)

(58) Field of Classification Search
CPC ..... A01D 87/127; A01D 90/083; B60P 1/165; B60P 1/433; B62D 53/067
USPC ................................. 414/24.5, 470
See application file for complete search history.

(56) References Cited

U.S. PATENT DOCUMENTS

| | | | |
|---|---|---|---|
| 5,277,537 A | 1/1994 | Druse, Sr. | |
| 5,333,981 A * | 8/1994 | Pronovost | A01D 90/083 |
| | | | 414/24.5 |
| 5,340,259 A * | 8/1994 | Flaskey | A01D 90/083 |
| | | | 414/24.5 |
| 6,537,008 B1 | 3/2003 | Haring | |
| 9,764,674 B2 | 9/2017 | Friesen et al. | |
| 10,160,369 B2 | 12/2018 | Friesen et al. | |
| 10,427,579 B1 | 10/2019 | Buchanan | |
| 11,026,370 B1 * | 6/2021 | Buchanan | A01D 90/10 |
| 11,590,876 B2 * | 2/2023 | Ledwell | B60P 1/165 |
| 2002/0081185 A1 | 6/2002 | Hedke | |
| 2006/0099061 A1 | 5/2006 | Smith, Jr. et al. | |

* cited by examiner

*Primary Examiner* — James Keenan
(74) *Attorney, Agent, or Firm* — Tomlinson McKinstry, P.C.

(57) ABSTRACT

A trailer having a deck and a flip-over ramp. The deck and one side of the flip-over ramp are convertible from a flat position to a position with cradles that are configured to hold one or more round hay bales. The deck may tilt, and side rails may cooperate to form the cradle region. The flip over ramp may also pivot about a horizontal axis to form a pathway from a ground surface to the deck. Side rails may pivot both about a horizontal axis, and about a vertical axis near the flip-over ramp to allow clearance when the ramp is deployed.

16 Claims, 22 Drawing Sheets

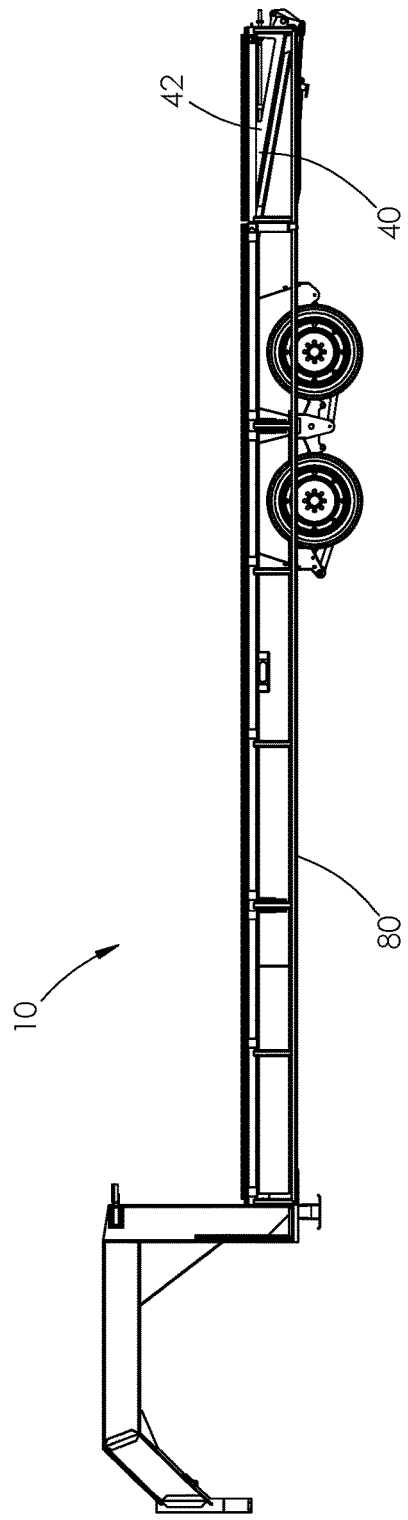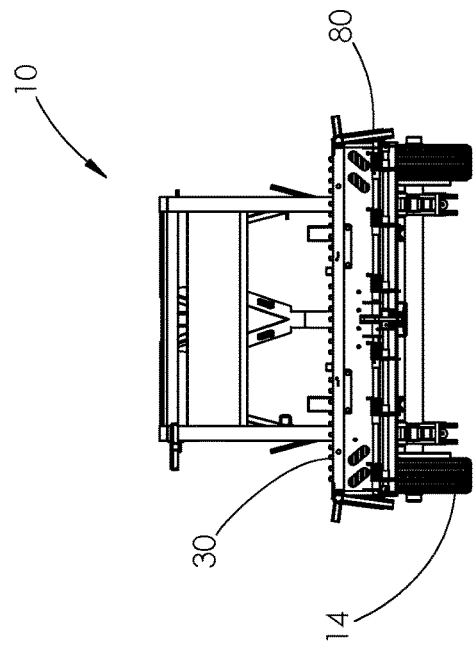
FIG. 9
FIG. 10
FIG. 11

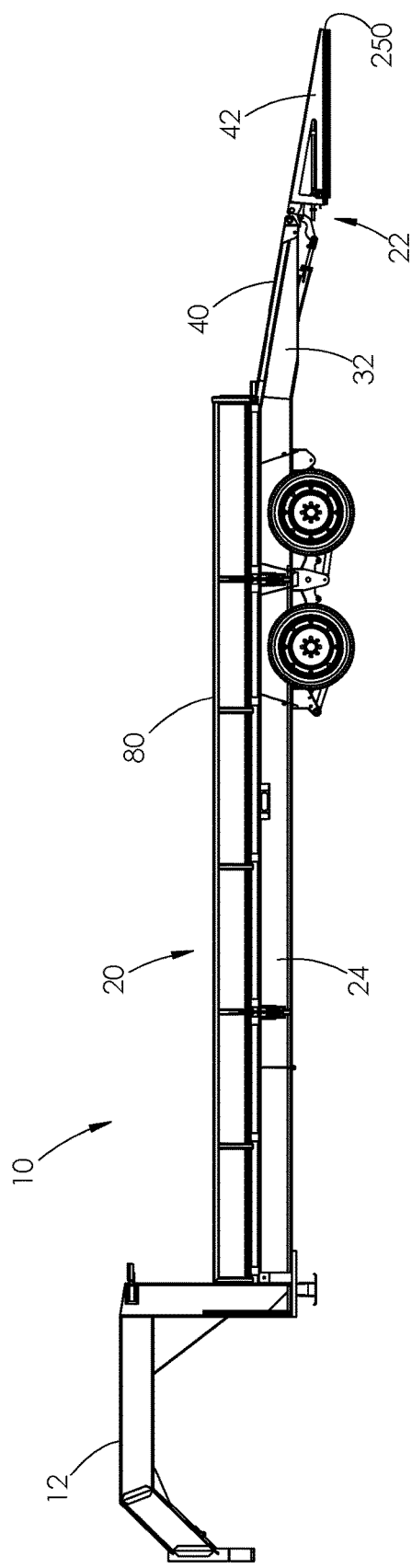
FIG. 20
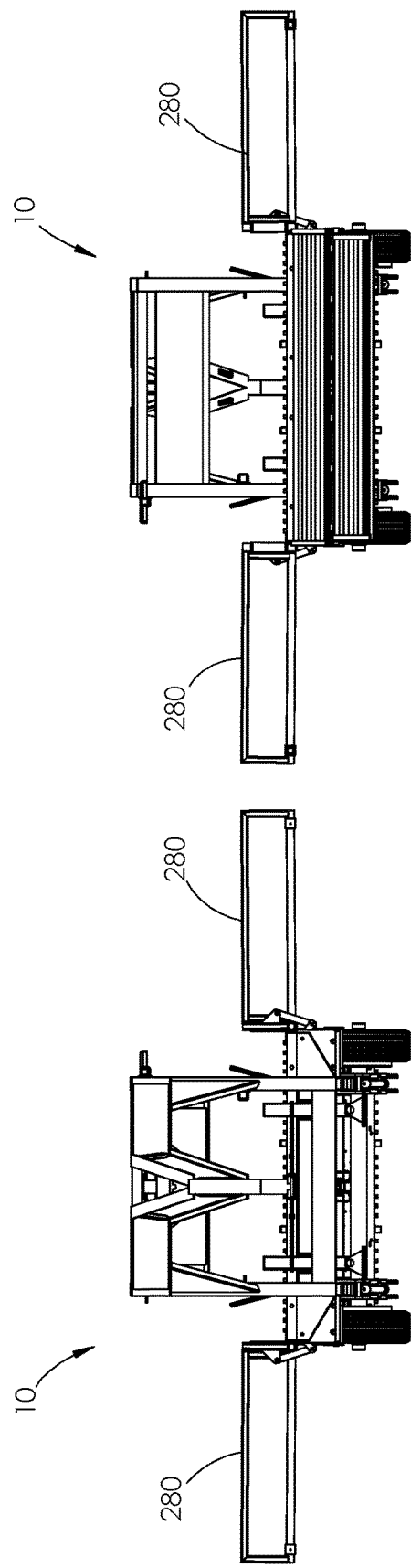
FIG. 22
FIG. 21

MULTI-USE TRAILER

SUMMARY

The invention is directed to a trailer. The trailer comprises a front section and a rear section. The front section has one or more deck sections, the front section being convertible between a first condition and a second condition. In the first condition, the one or more deck sections form a generally flat surface. In the second condition, the one or more deck sections form a cradle for support of a load.

The rear section has a first second and third condition. The rear section comprises one or more deck sections supported by a first frame, a pair of side rails attached to the front section, a ramp extending from the front section, and a hinge interconnecting the ramp and the first frame. The first condition of the rear section is defined by the deck being generally flat and oriented to conform to the first condition of the front section. The second condition is defined by the deck sections being oriented to conform to the second condition of the front section. The third condition is defined by the first frame being pivoted about the hinge, such that the ramp is not below the deck sections.

A ramp for a trailer comprising an adjustable deck. The adjustable deck has a first length. The trailer is adjustable between first and second condition, the first condition being substantially flat and the second condition being defined by a portion of the adjustable deck pivoting about a horizontal axis. The horizontal axis is disposed along the first length of the deck. The ramp comprises a first frame section, a second frame section having first and second ends, and first and second side rails. The second frame section extends from the trailer at its first end and defines a hinge axis at its second end. The second frame section is connected to the first frame at a hinge axis. The first and second side rails are each pivotally connected to the trailer about a rail axis and configured for selective attachment to the first frame section at an attachment point.

The first frame section has a first surface. The second frame section has a second surface. The first frame section also has an adjustable surface, wherein the adjustable surface is pivotal about the horizontal axis. The first and adjustable surfaces meet at a first angle.

BRIEF DESCRIPTION OF THE DRAWINGS

FIG. 9 is a left side view thereof.
FIG. 10 is a front view thereof.
FIG. 11 is a rear view thereof.

FIG. 20 is a left side view thereof.
FIG. 21 is a front view thereof.
FIG. 22 is a rear view thereof. It should be understood that the flip over ramp in FIG. 22 is shown not reaching the ground, but gravity and other factors will ensure that it does so in real-world conditions.

DETAILED DESCRIPTION OF THE DRAWINGS

Figure 1:
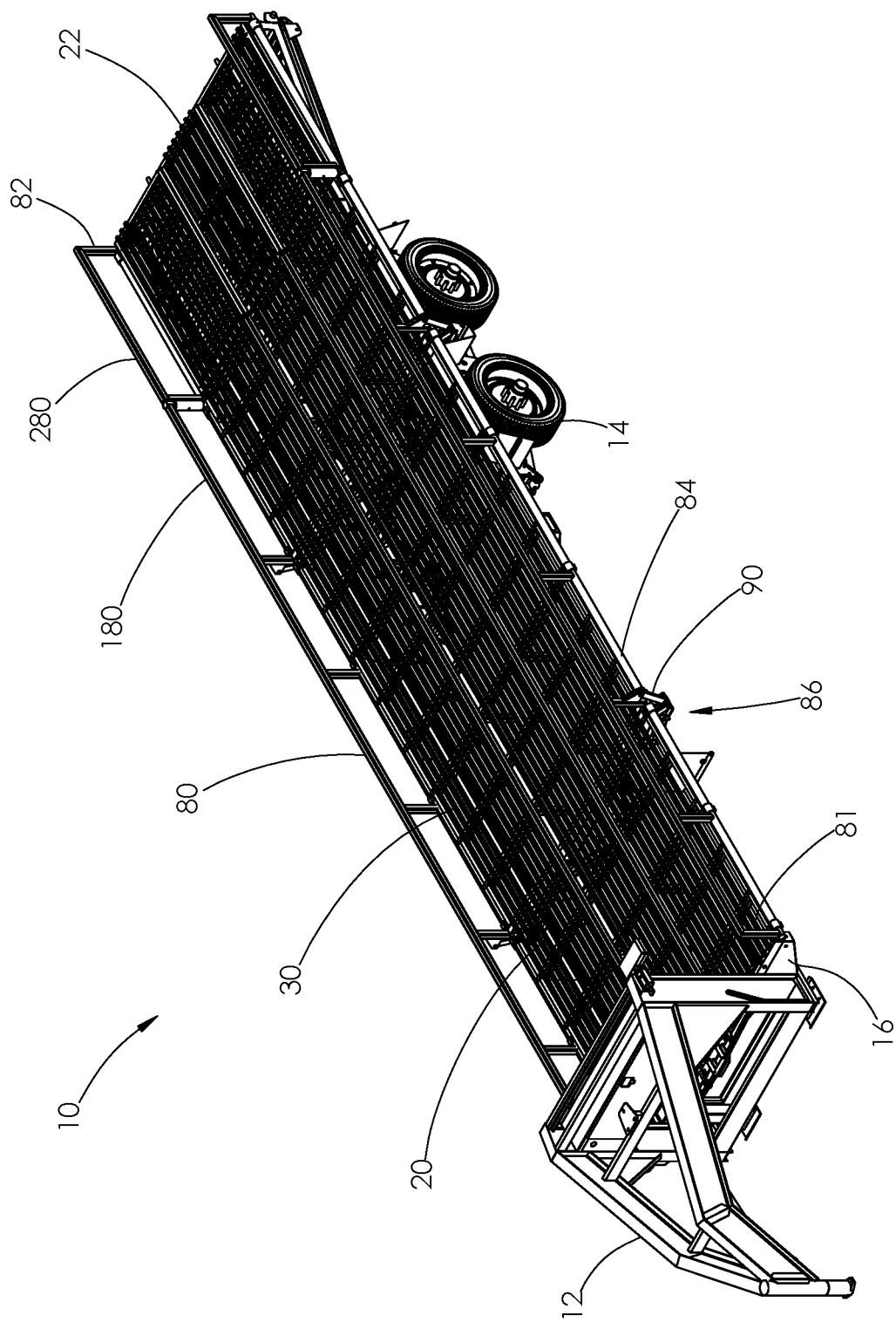
FIG. 1 is a front left perspective view of a trailer in a first configuration, with the decking material in a flat configuration and the ramp stowed, with side rails in a vertical position.
Figure 2:
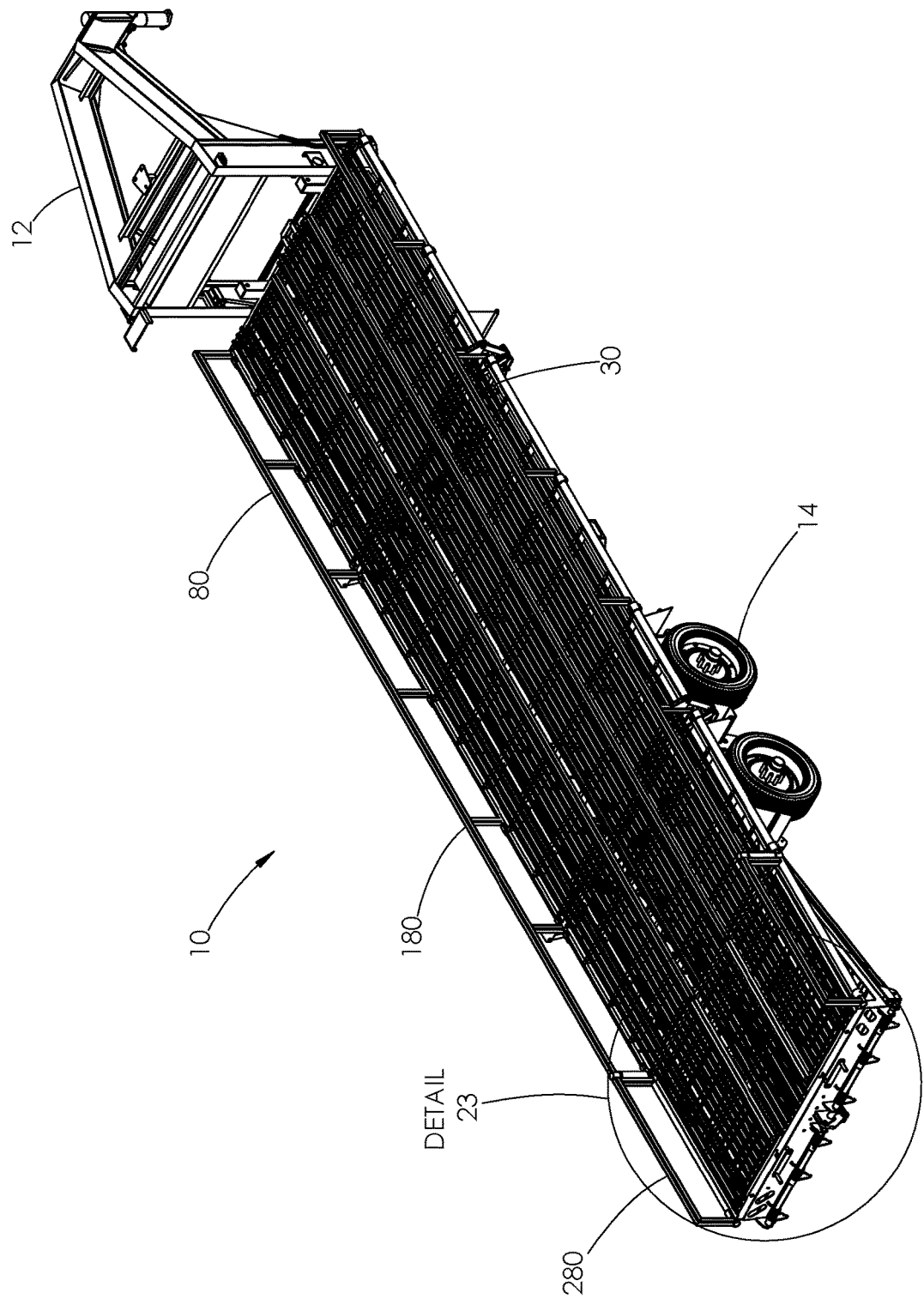
FIG. 2 is a right rear perspective view thereof. Detail 23 is taken from this Figure.
Figure 3:
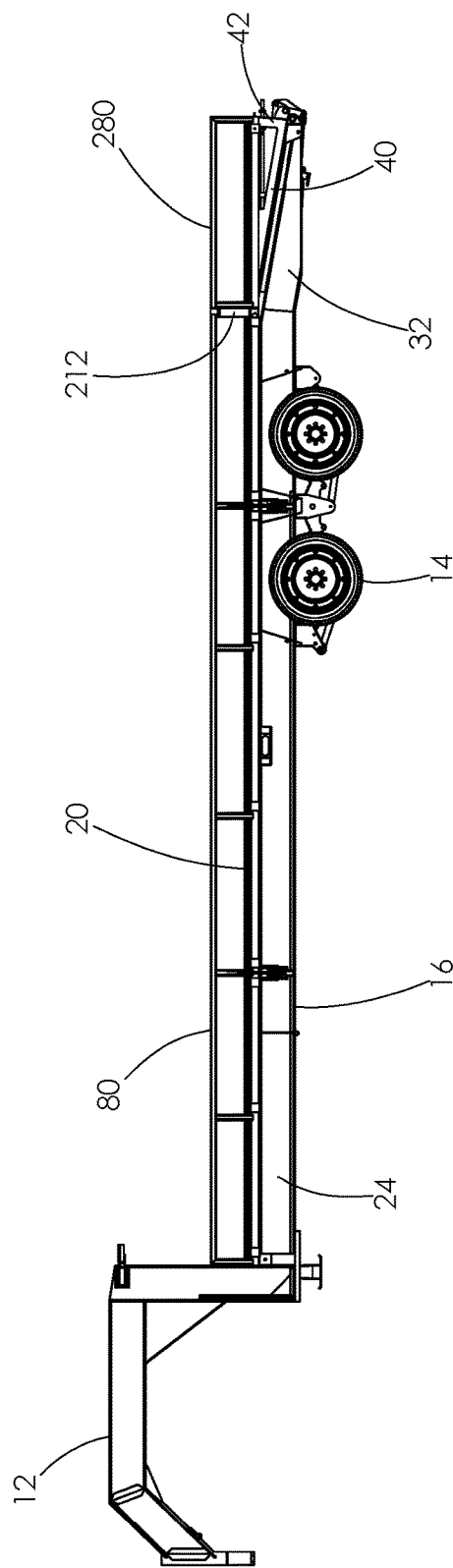
FIG. 3 is a left side view thereof.
Figure 5:
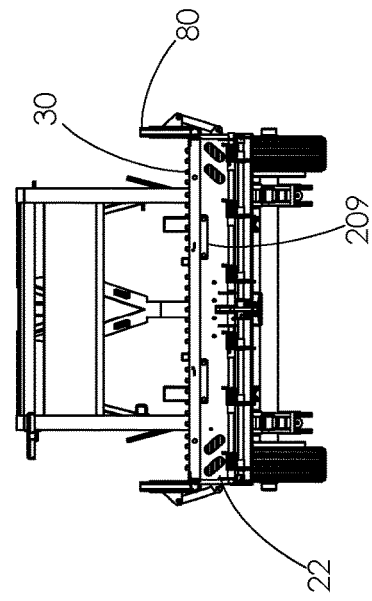
FIG. 5 is a rear view thereof.
Figure 4:
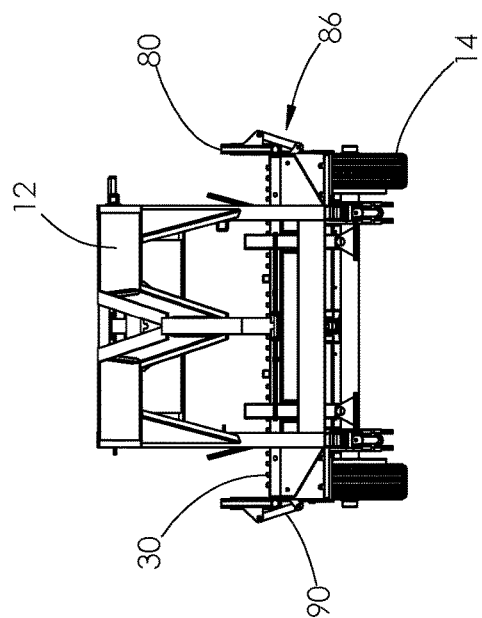
FIG. 4 is a front view thereof.
Figure 6:
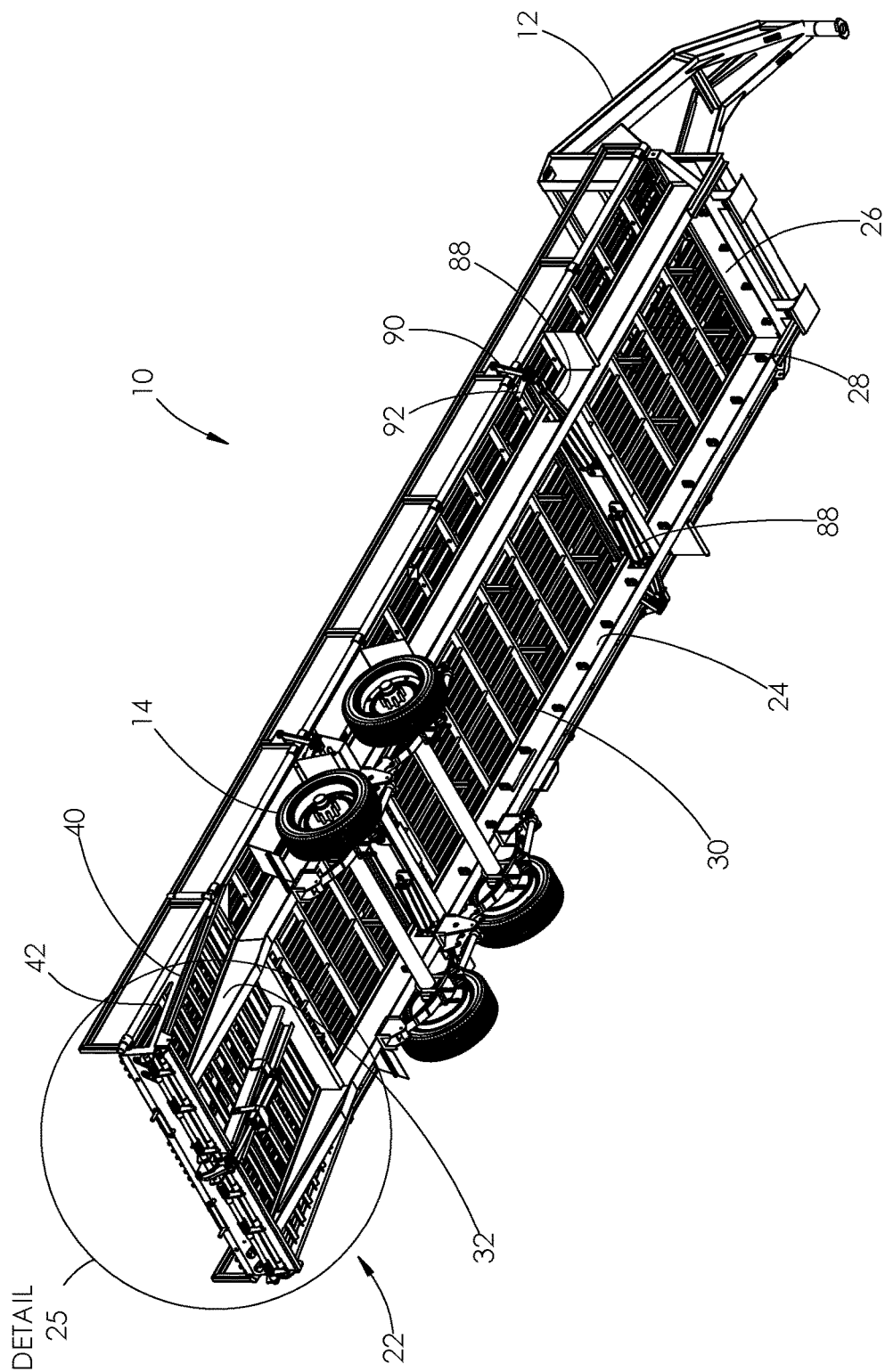
FIG. 6 is a bottom right rear view thereof. Detail 25 is taken from this Figure.

The present disclosure includes improvements to a multi-use trailer, such as the trailer described in U.S. Pat. No. 6,537,008, issued to Haring, the contents of which are hereby incorporated by reference. The trailer in the '008 reference has a deck which is adjustable for transporting large round hay bales, namely by the tilting of an external rail outward and the pivoting of the deck upward, creating two "cradles" which traverse a length of the bed. A leg may be placed between a structural frame element of the trailer and the pivoting deck to maintain the frame in its angled position.

Thus, the deck of the trailer may be moved from a flat position, in which it can transport rectangular bales, to the angled position, in which it can transport round bales, depending upon the need of the operator.

Further, flip over ramps have become popular for use on a flat bed trailer. For example, U.S. Pat. Pub. No. 2002/0081185, Hedtke, et al., shows a flat bed trailer having a pivotally-attached, rearwardly disposed flip over ramp. U.S. Pat. Pub. No. 2002/0081185 is incorporated by reference herein.

When the Hedtke ramp is deployed, a truck has an angled approach by which it can drive up to the flat bed. When it is retracted, the ramp flips over onto an angled frame section. A surface, which is against the ground in the previous configuration, now forms a uniform extension of the flat deck of the trailer.

It would be advantageous to provide a flip over ramp, as shown in Hedtke, with the configurable deck of Haring, such that the flip over ramp would be able to conform to the surface of the deck.

However, barriers to such a design exist. For example, the side rails in Haring are incompatible with a flip over ramp. Side rails must be able to maintain the same angle relative to the deck in order to form a consistent cradle. Rails would impede the use of the ramp. Further, the triangular prism of the flip over portion of the Hedtke ramp makes much of the substructure of the Haring deck impossible.

With reference to the figures, a design for a trailer 10 which provides the benefit of both of the above apparatus is shown. The trailer 10 comprises a coupling assembly 12, which, as shown, may be used to attach the trailer 10 to a fifth wheel. Other coupling designs may be used, including those which connect to a trailer hitch. Further, the trailer 10 shown may be integrally formed as a dedicated portion of a tractor-trailer.

The coupler 12 may include a tool box (not shown) or a power pack and control mechanisms for the various hydraulic and mechanical functions of the trailer 10. Any hydraulic hoses or lines required to operate the various cylinders of the invention are eliminated from the drawings for clarity, but should be understood to be present. The power pack may be powered by the tow vehicle, or may be independently powered.

The trailer 10 is supported across a surface of the ground by one or more wheels 14. For stability, four wheels 14 are shown. Doubling each wheel may be advantageous in some applications.

The trailer 10 has a first decking section 20 and a rear ramp apparatus 22. The trailer has a frame 16, supported by the wheels 14, which is comprised of longitudinally-arranged beams 24, laterally extending beams 26, lateral trusses 28 supported by the longitudinal beams 24, and longitudinal decking 30 supported by the trusses 28. The decking 30 as shown is a square metal tubing, though other decking may be used. In the embodiment shown in the drawings, the decking 30 is largely one inch square tubing. However, at a distal end of each movable section 100 (as described below), one larger bit of decking material 30 is used, such as two inch square tubing. Such larger tubing may aid in the rigidity of a movable section 100.

Throughout the specification, an orientation of the decking 30 of the trailer 10 may be referred to as "flat." It should be understood that in the context of this invention, "flat" means that the top surface of the decking material 30 cooperates to form a generally horizontal surface. It need not be completely planar. For example, the movable sections 100 may be slightly higher than the immovable sections 102. "Flat", in this context, does not preclude spacing between the decking members, as shown in the figures. It also does not preclude the use of decking members which are substantially parallel, but due to size differences, do not have completely co-planar top surfaces. FIGS. 1-11 should therefore be construed as a "flat" configuration for the decking 30, despite the existence of spaces between individual tubing.

Further, the word "surface" may be used in a similar manner—to describe the place at which an object may be held up by the decking elements that form the deck of the trailer. Calling something a "surface" for the purposes of this invention does not require an element to be contiguous—rather—a group of elements, cooperating in the same plane as a surface might, shall be considered a "surface" even if it is made up of, for example, parallel square tubing having co-planar (or nearly co-planar) top sides with gaps therebetween. An artisan would understand the "top surface" of a trailer to be contiguous even if it is truly made of multiple "surfaces" due to the use of square tubing.

The longitudinal beams 24 may be uniform in structure for the length of the first decking section 20. As shown, the longitudinal beams have a tapered section 32 disposed beneath the rear ramp apparatus 22. The tapered section 32 allows the trailer 10 to maintain a substantially similar ground clearance beneath its entire length. The top surface of the tapered section 32 recedes at an angle relative to the flat orientation of the decking 30. This tapered section 32 increases the clearance between the bottom of the beam and the ground, due to the taper of the beam as it approaches the back end of the ramp apparatus 22 of the trailer 10.

As best shown in FIGS. 23-26, the rear ramp section 22 comprises a transition section 40 and a flip over ramp 42. When in the orientation shown in FIGS. 1-11, as well as FIG. 23, the flip over ramp 42 is disposed directly above, and supported by, the transition section 40. The transition section 40 is attached at a first end 44 to the first decking section 20. The transition section 40 may continue to include trusses 28 and lateral beams 26 (See FIG. 6).

The transition section 40 is supported directly above the tapered section 32 and thus portions of the transition section further away from the front deck section 20 are lower to the ground than those close to the front deck section. In this way, the trusses 28 of the transition section 40 would form a ramp when exposed.

Figure 17:
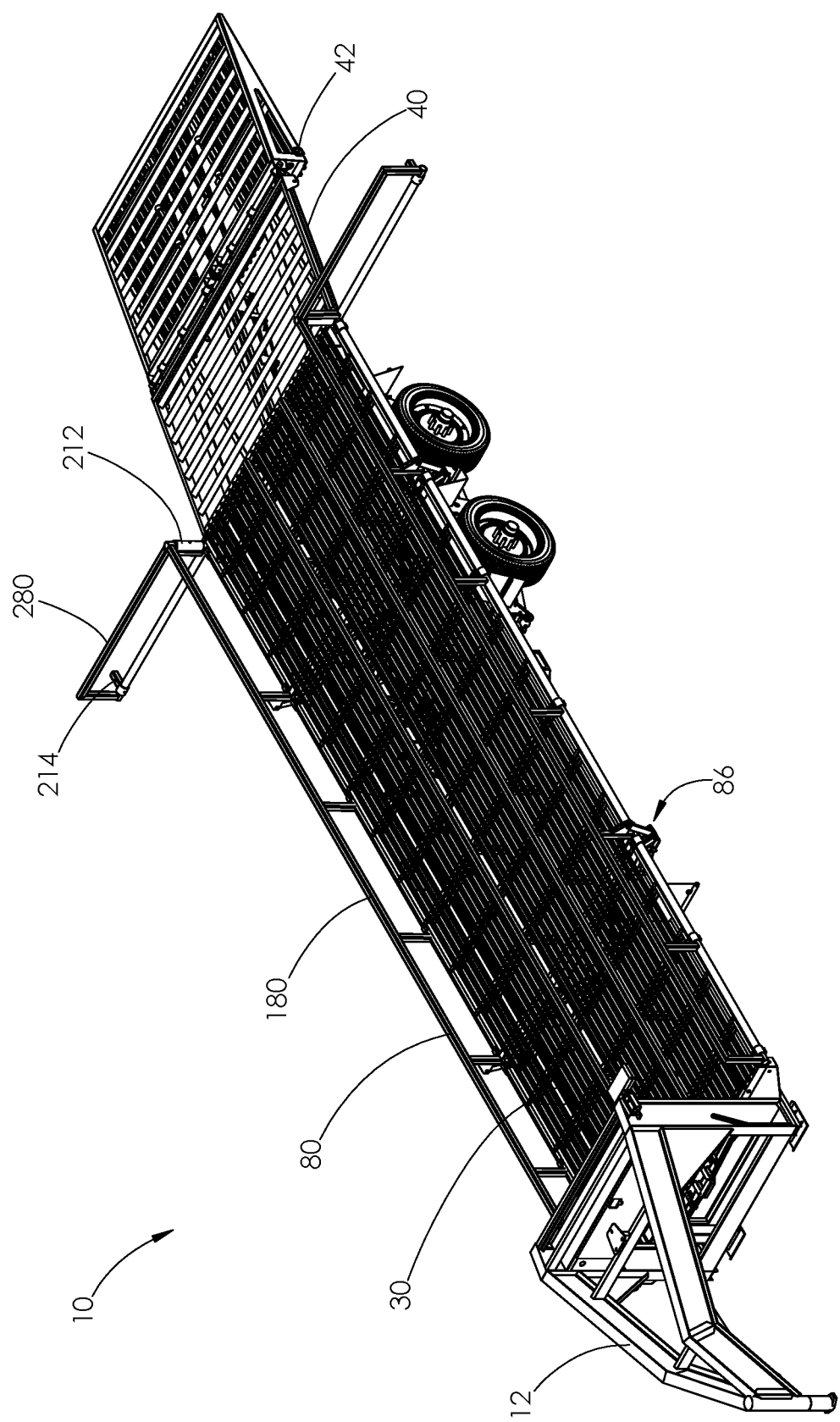
FIG. 17 is a left front perspective view of the trailer in a third configuration, where movable decking is flat, and the rear ramp section is deployed such that the flip over ramp and transition portion cooperate to form a ramp. A rear portion of each side rail is pivoted away from the ramp.

The transition section 40 is connected at its second end 46 to the flip over ramp 42. The flip over ramp 42 is generally shaped like a triangular prism, with a flat side (the top side in FIG. 1) and an opposed sloped side which meet at an angle along a line 250. This line forms the end of the trailer 10 when the flip over ramp 42 is deployed in the third configuration, and is approximately located where the front deck section 20 and rear ramp apparatus 22 meet when the flip over ramp is stowed in the first or second configuration. The opposed sloped side becomes the ramp decking 70 when in the third configuration as shown in FIG. 17, and thus preferably matches the slope of the transition section.

The connection between the transition section 40 and the flip over ramp 42 is, as shown, a spring-loaded hinge 50. The hinge 50 comprises a horizontal bar 52 and multiple springs 54. Further, the hinge comprises a ramp actuator 56, best shown in FIGS. 23 and 25. The ramp actuator 56 is attached to a beam 58 that is integral with the frame 16 of the trailer 10. As shown, the beam 58 extends between lateral beams 26 of the trailer frame 12.

While other linear actuators 56 may be used to actuate the flip over ramp, the embodiment shown is a hydraulic cylinder. A rod 59 of the ramp actuator 56 is attached to an arm 60 of the hinge 50. The arm 60 is then connected to a brace 62 which is integral with the flip over ramp 42. As the rod 59 is retracted, the arm 60 pulls on the brace 62, which in turn is attached to a laterally disposed plate 64 of the flip over ramp 64. Actuation of the ramp actuator 56 thus causes the flip over ramp 42 to pivot about the horizontal bar 52. As a result, the flip over ramp 42 moves to the position shown in FIG. 26.

The flip over ramp 42 comprises a ramp decking 70 supported by laterally oriented trusses 72. Longitudinal beams 74 extend from the lateral plate 64 to provide support for the trusses 72. FIG. 24 shows the trusses 72 and beams 74 with the decking 70 removed for clarity. Unlike the trusses 28 and beams 24, 26 of the decking section 20, the structures of the flip over ramp 42 are separate, attached only by the hinge 50. In the orientation of FIGS. 1-11 and 23, the flip over ramp 42 is supported by the transition section 40. In the orientation of FIGS. 17-22 and 26, the flip over ramp 42 is supported by a ground surface (not shown).

When deployed, in FIGS. 17-22 and FIG. 26, a ramp surface 76 is exposed. The ramp surface may comprise trusses 77, or may be plating or other surface suitable for moving equipment or vehicles up and down a ramp. The bottom surface 76 cooperates with the transition section 40 to form a path of travel from a ground surface to the decking 30 of the trailer 10.

Figure 7:
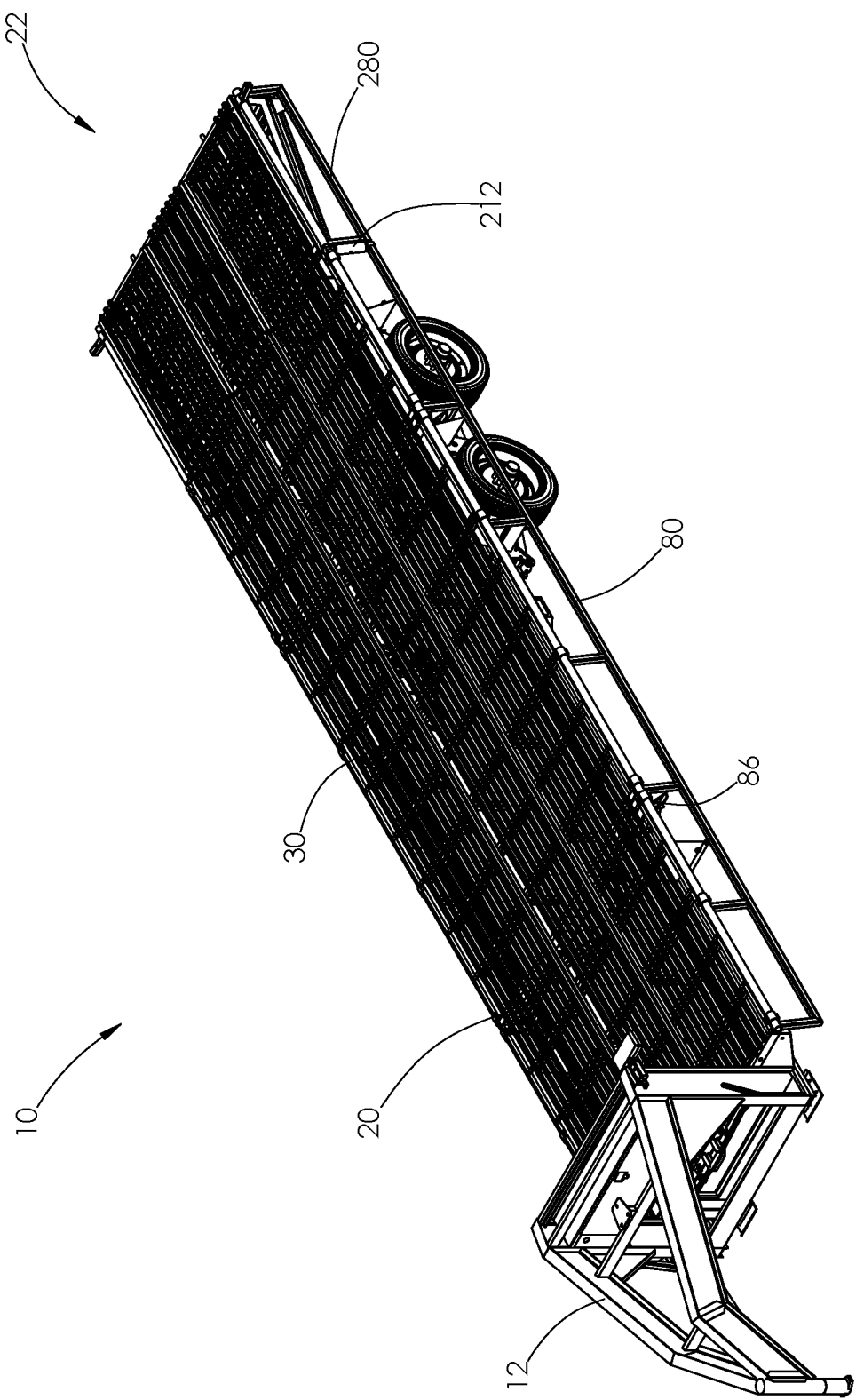
FIG. 7 is a front left perspective view of the trailer in the same configuration as FIG. 1, except that the rail actuator is retracted to allow the side rails to be rotated 180 degrees from the view shown in FIG. 1.
Figure 8:
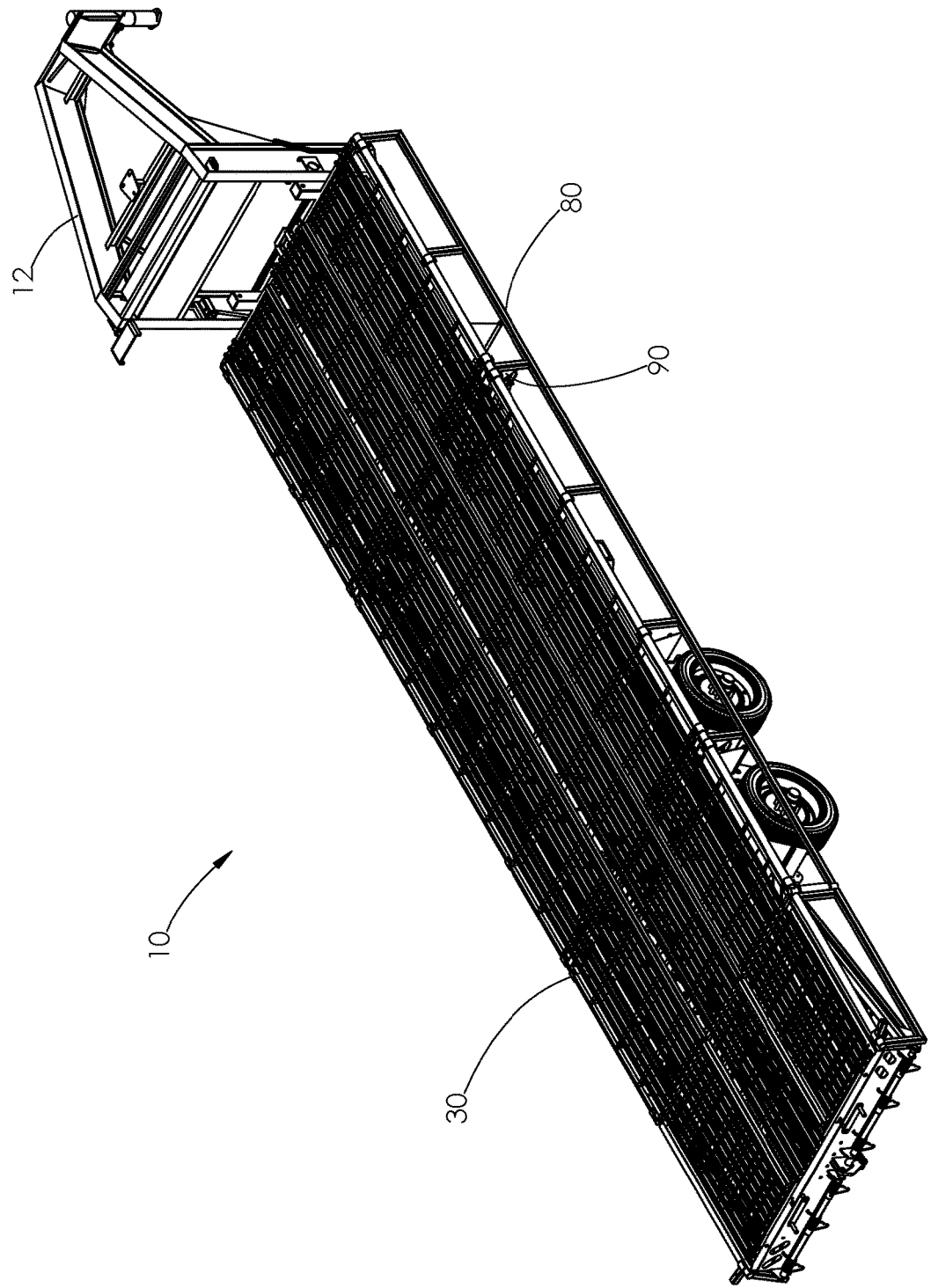
FIG. 8 is a right rear perspective view thereof.
Figure 12:
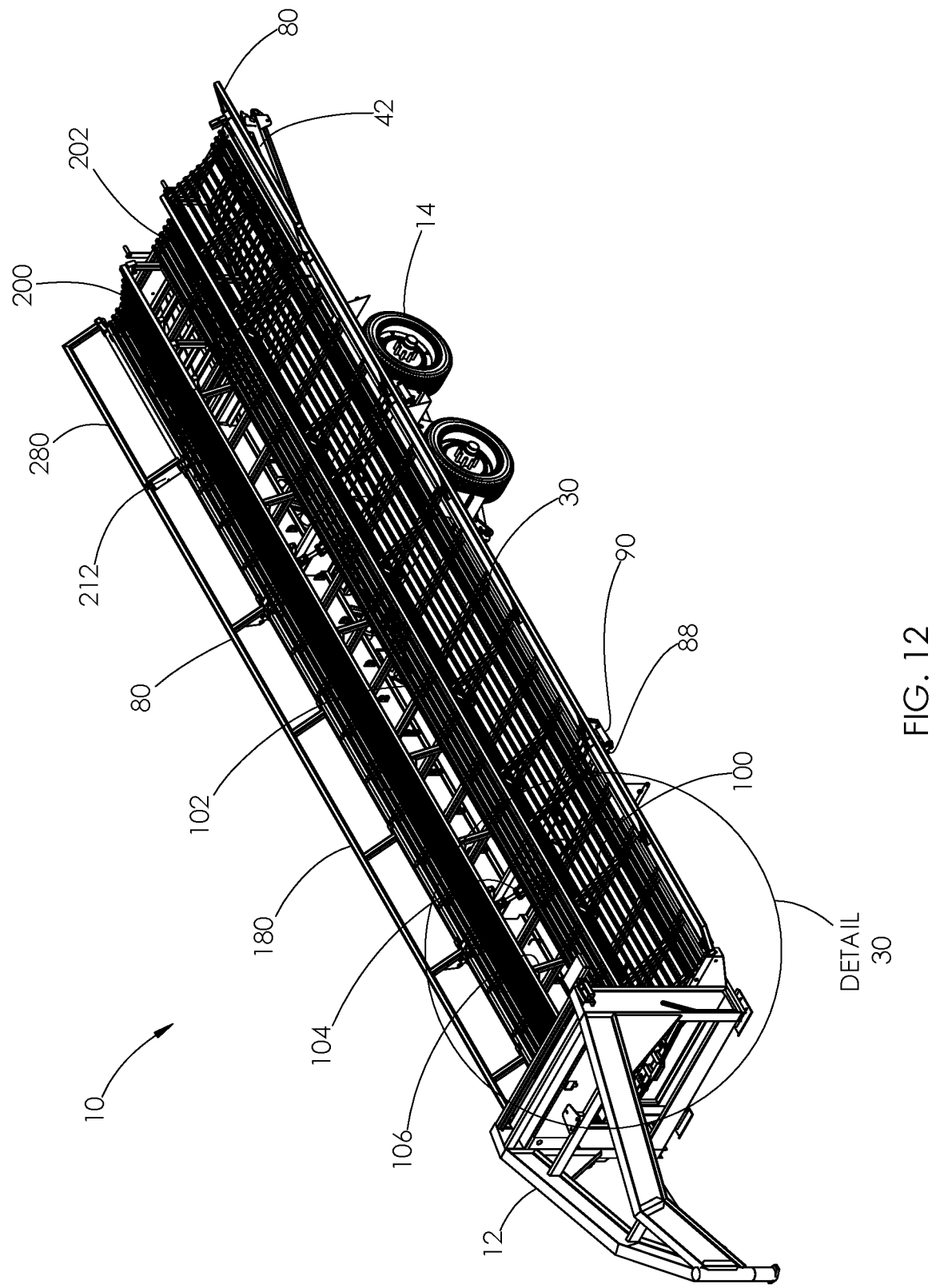
FIG. 12 is a left front perspective view of the trailer in a second configuration, where movable decking elements are pivoted to an angled position along a longitudinal axis. Side rails are likewise pivoted longitudinally to form a cradle therebetween.
Figure 13:
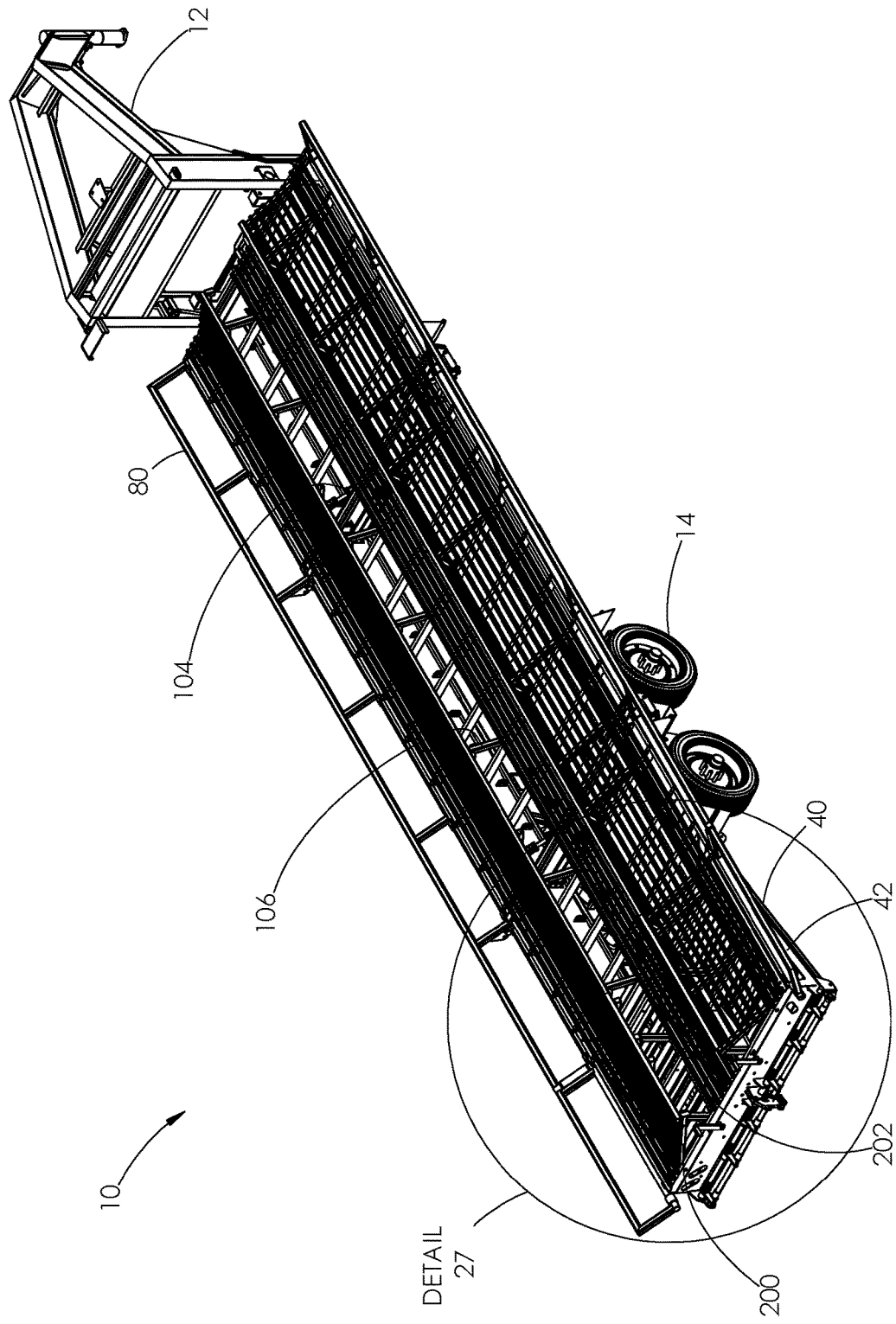
FIG. 13 is a right rear perspective view thereof. Detail 27 is taken from this figure.
Figure 14:
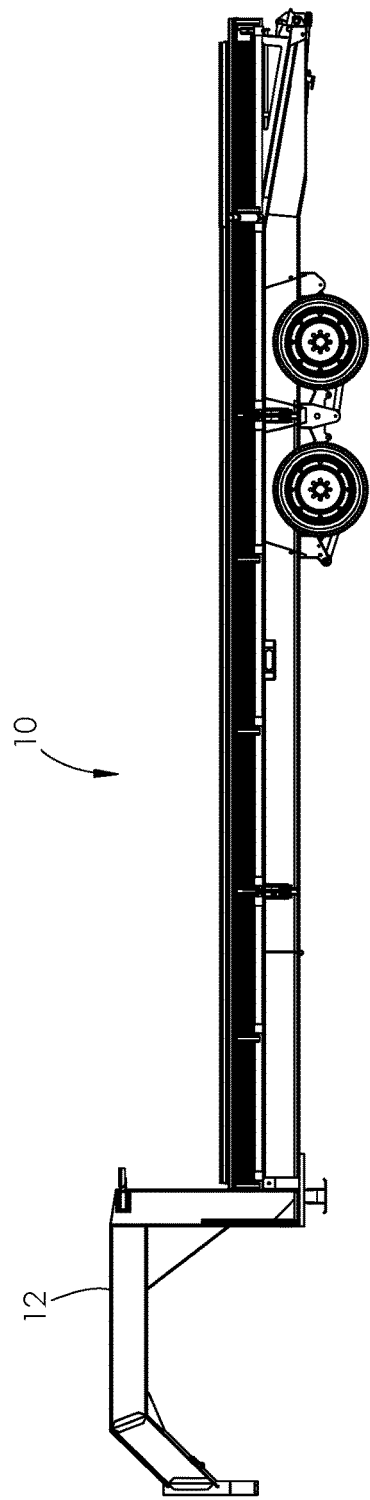
FIG. 14 is a left side view thereof.
Figure 16:
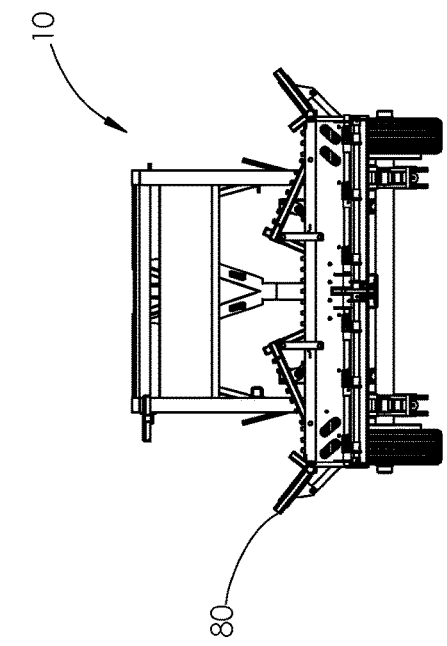
FIG. 16 is a rear view thereof.
Figure 15:
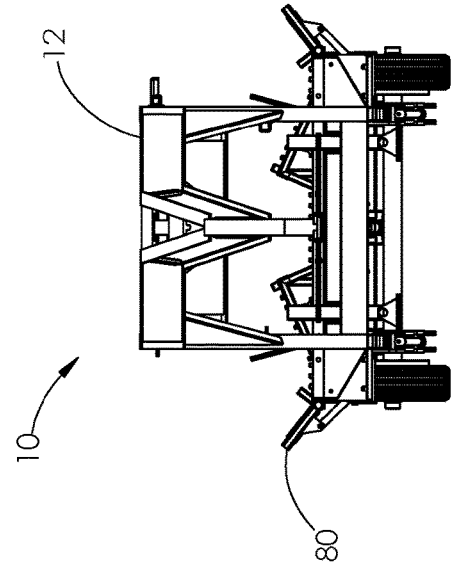
FIG. 15 is a front view thereof.

With reference to all of the Figures, and FIGS. 1 and 7 in particular, the trailer 10 comprises a pair of side rails 80 which extend the length of the trailer, from a front end 81 to a rear end 82. The side rails 80 are each rotatable about a longitudinal axis which is co-extensive with its base 84. A rail actuator 86 operates on each side to move the rail 80 from the upright position, as in FIGS. 1-6, to the fully retracted position, as in FIGS. 7-12.

Figure 29:
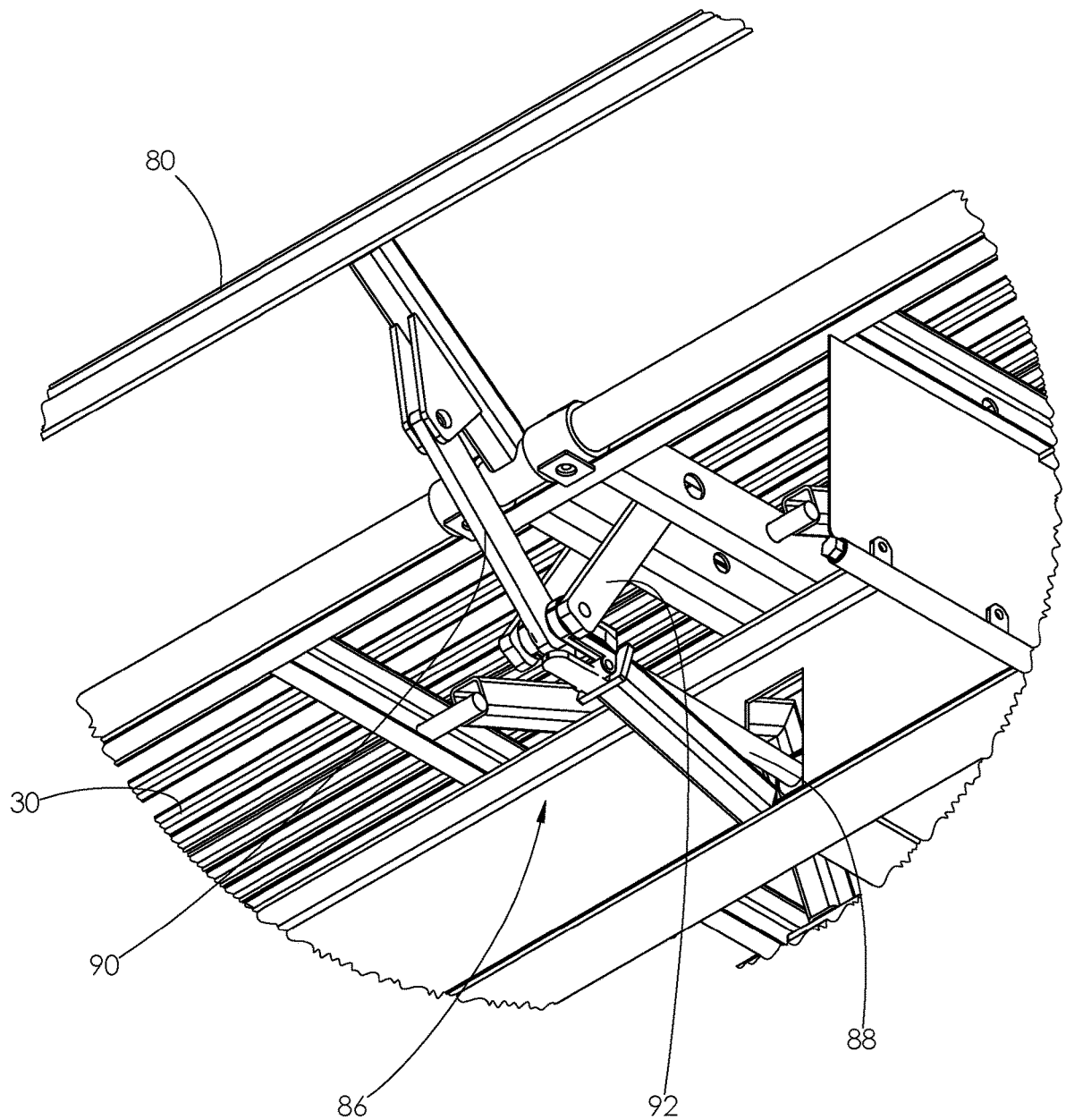
FIG. 29 is a bottom right rear view of the rail actuator assembly, taken from FIG. 28.

As best shown in FIG. 29, the rail actuator 86 comprises a cylinder 88, a bar 90, and a brace 92. The cylinder 88 extends and retracts to impart motion to the bar 90, which in turn actuates the rails 80. As shown, retraction of the cylinder 88 causes the rails 80 to pivot downward. The brace 92 is connected to the frame 16 and includes a c-channel at the point at which the bar 90 meets the cylinder 88. The brace 92 comprises two structural elements, each attached to a side of the pivot point between the cylinder and bar. The brace 92 insulates this connection from movement in the trailer caused by a load being placed on the decking 30.

With reference now to FIGS. 12-16, the decking material 30 of the first decking section 20 of the trailer 10 comprises one or more movable sections 100 and an immovable section 102. The first decking section comprises one or more cylinders 104 connected at one end to the lateral beams 26 and at the other end to the movable decking sections 100. The movable decking sections 100 may have one or more supports 106 attached to a bottom surface of the decking 30.

The first decking section 20 may be moved from its flat configuration in FIGS. 1-11 to the tilted second configuration of FIGS. 12-16 by initiating the one or more cylinders 104. As shown, each movable decking section 100 is actuated by a pair of cylinders 104. The combination of larger decking material 30 at a "high" end of the movable decking section 100 and the use of two cylinders 104 per movable decking section results in greater strength and the ability to "overtilt" a load situated on the movable section 100 in its second, tilted, configuration. Such overtilting aids in off-loading hay bales.

Figure 30:
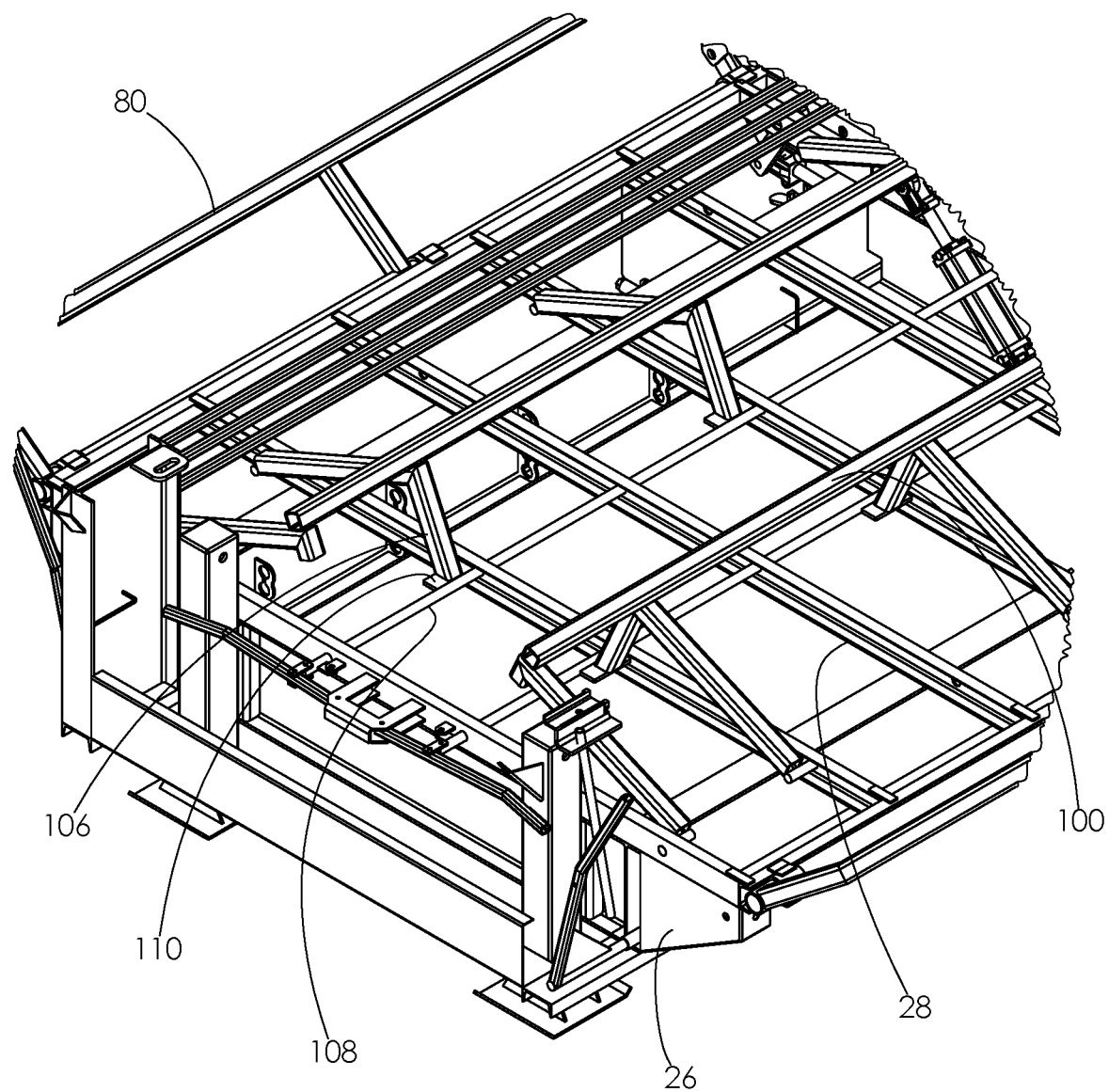
FIG. 30 is a bottom right rear view of the actuator for the movable deck portion, taken from FIG. 28. Decking material has been removed to allow components to be seen more clearly.

As best shown in FIG. 30, the movable sections 100 tilt upwards, exposing the supports 106. A longitudinal rod 108 extends the length of the movable decking section 100, and has a plurality of attached platforms 110 corresponding to the number of supports 106. With the movable sections 100 fully tilted, the supports 106 clear the platforms 110. The rod 108 is then adjusted to place the platforms 110 underneath the supports 106. This adjustment may be a rotation of the rod 108 to move the platforms from a vertical to horizontal orientation. Alternatively, the rod 108 may move longitudinally to place the platforms 110. The movable decking section 100 can then be tilted until the supports 106 contact the platforms 110, holding the movable decking section 100 in the tilted position.

It should be appreciated that when the movable decking section 100 is in the tilted position, it is advantageous to angle the side rails 80 to between 30 and 60 degrees from vertical, in the opposite direction of the movable decking section 100. The side rails 80 and movable decking section 100 cooperate to form a cradle in which a round hay bale can be situated.

Figure 23:
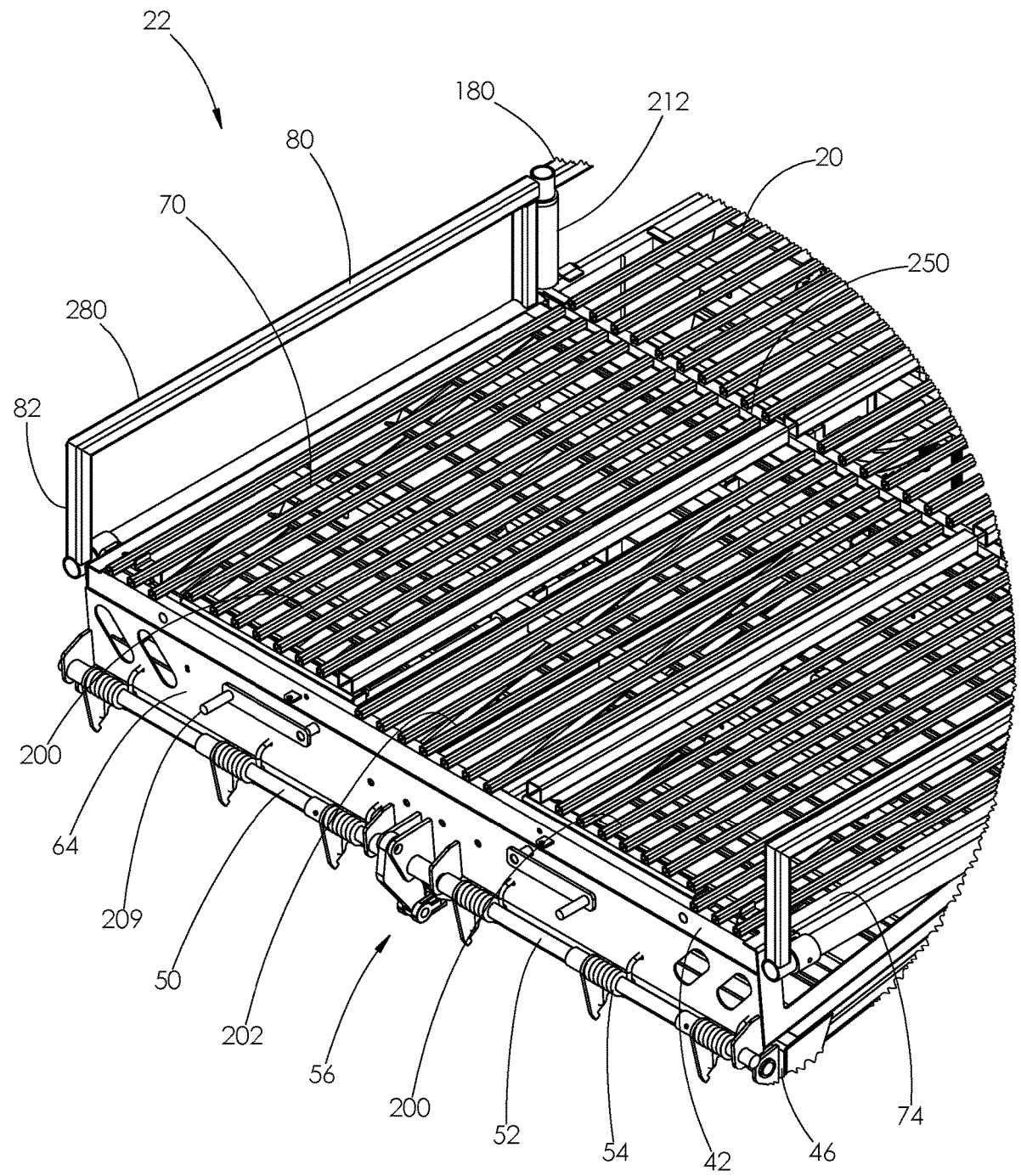
FIG. 23 is a right rear top perspective detail view taken from FIG. 2, with the flip over ramp stowed and the deck in the first configuration.
Figure 24:
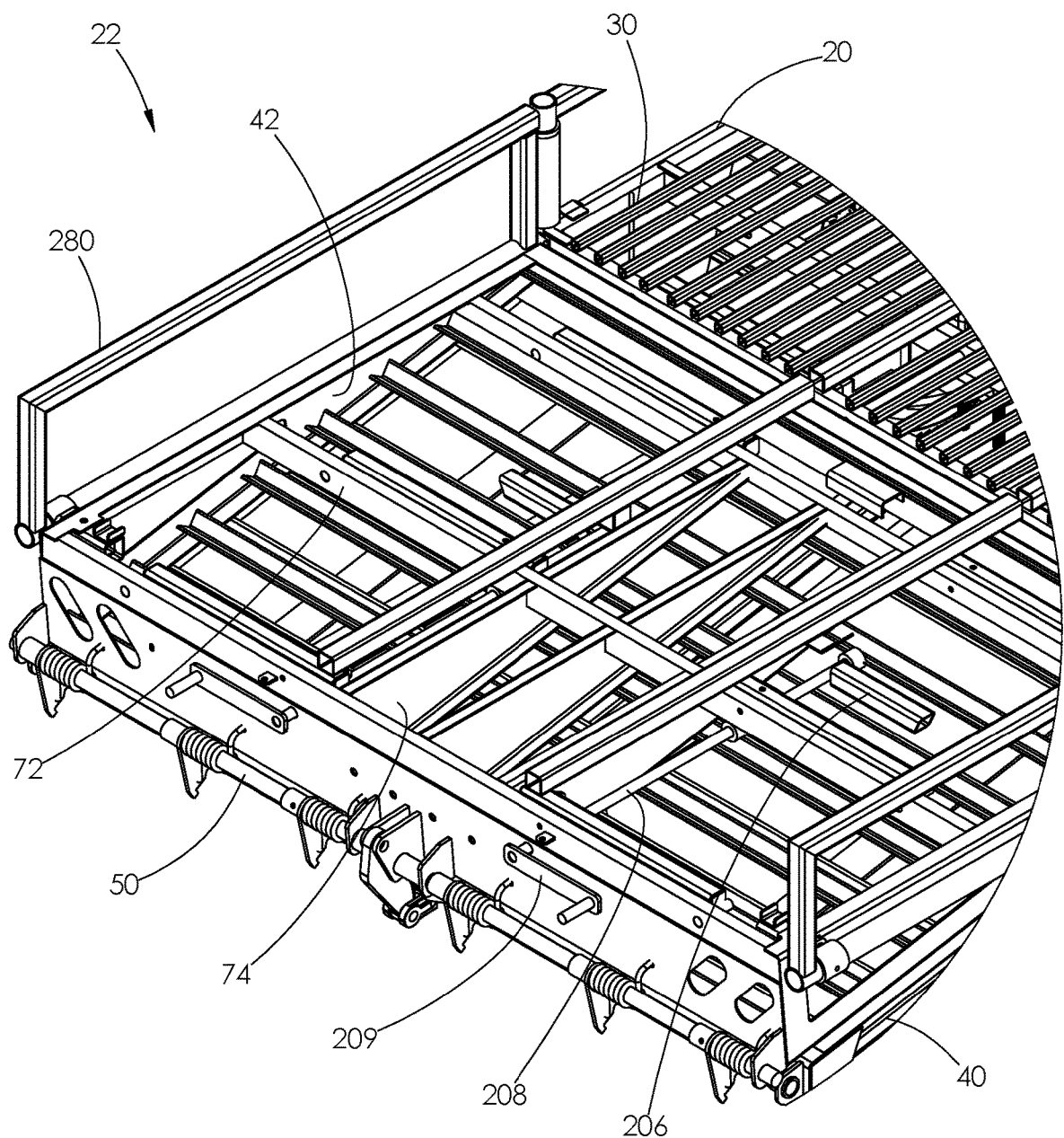
FIG. 24 is the view of FIG. 23, but with the decking material removed to show structural elements within the flip over ramp, including tapered frame elements and the supports for allowing the frame to tilt, as best shown in FIG. 27.
Figure 25:
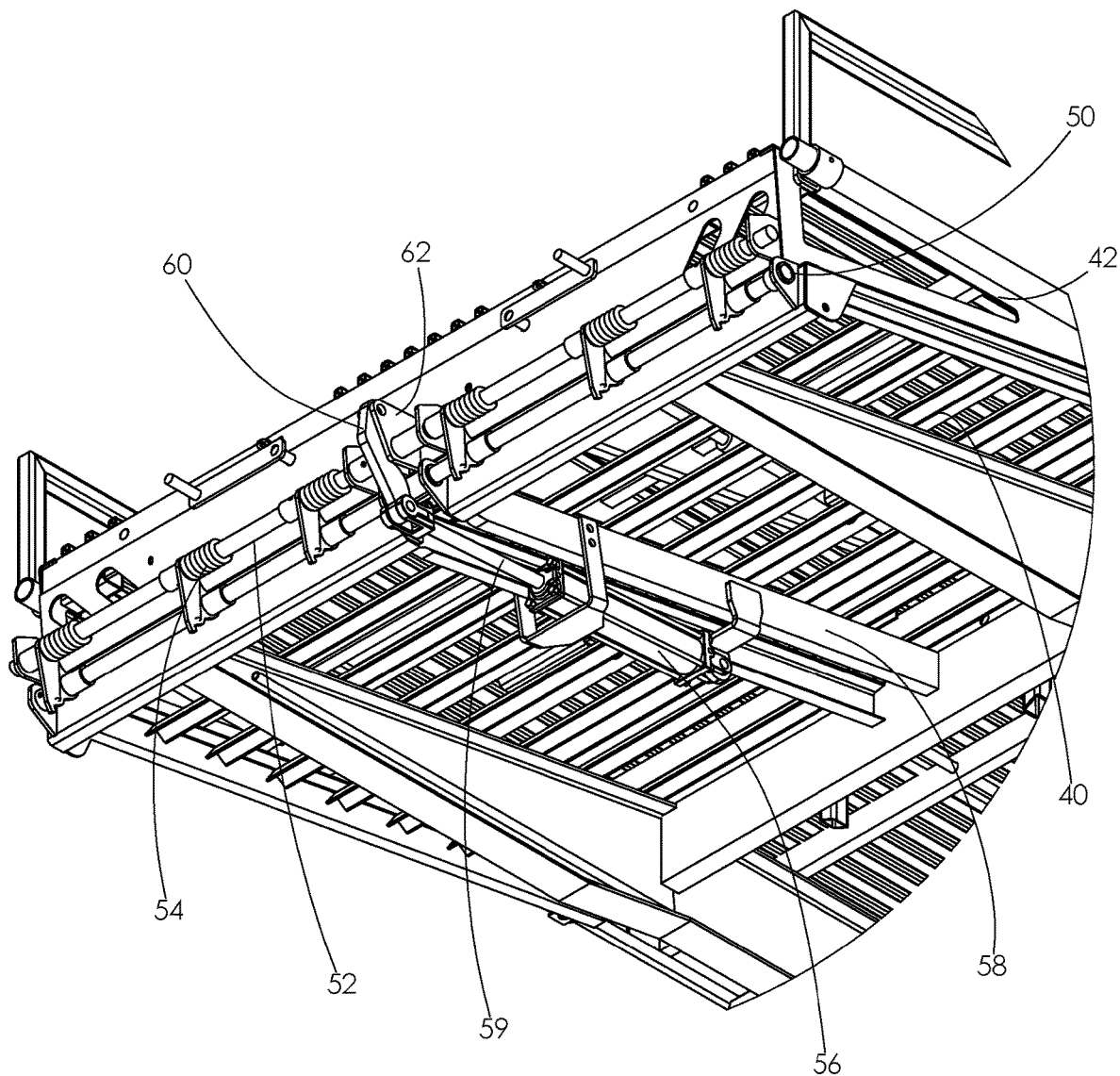
FIG. 25 is a right rear bottom detail view taken from FIG. 6. This view is also the bottom view of the configuration of FIG. 23. The cylinder for deploying the flip over ramp is shown.
Figure 26:
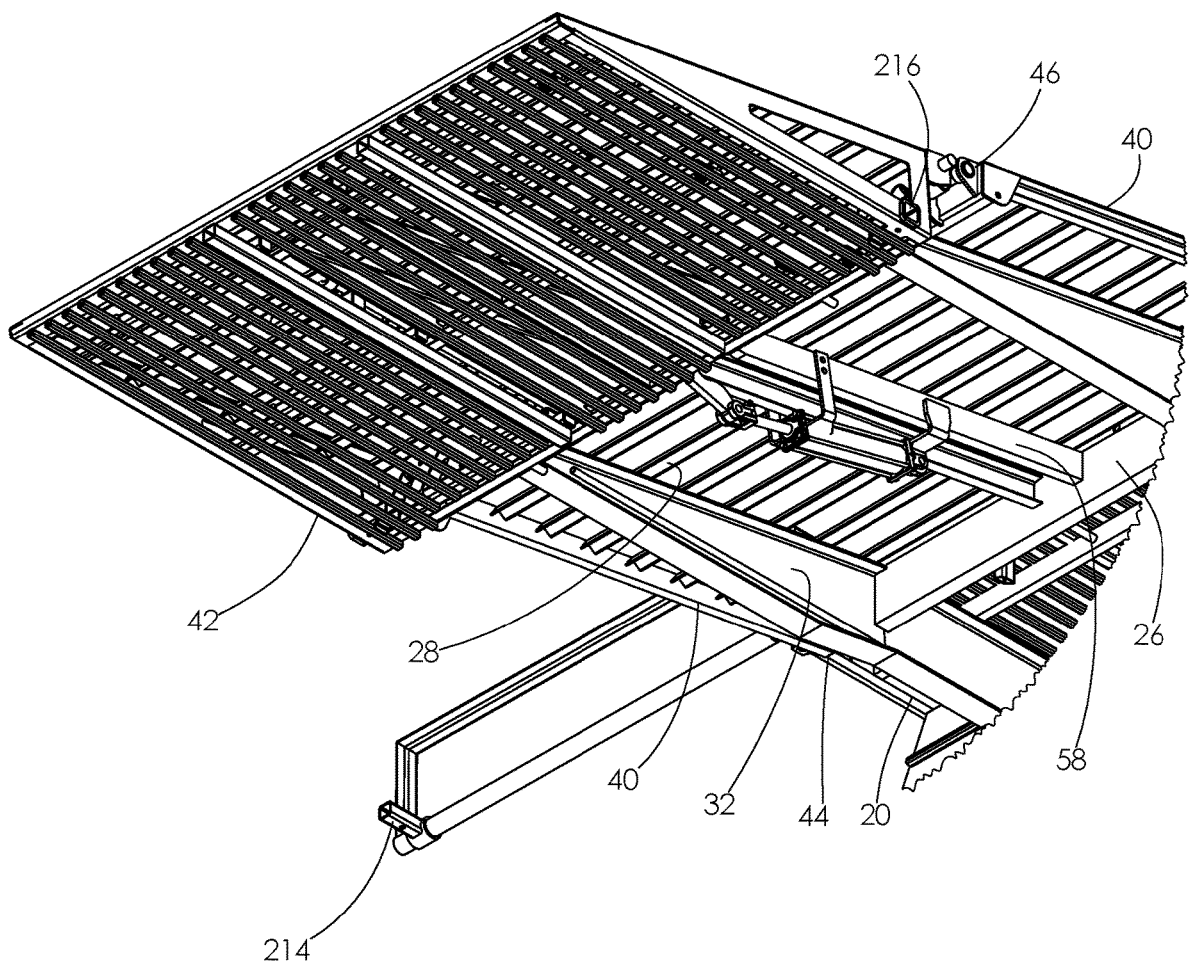
FIG. 26 is a right rear bottom detail view taken from FIG. 19. This view is also FIG. 25, moved from the first configuration to the third configuration, with the flip over ramp deployed.
Figure 27:
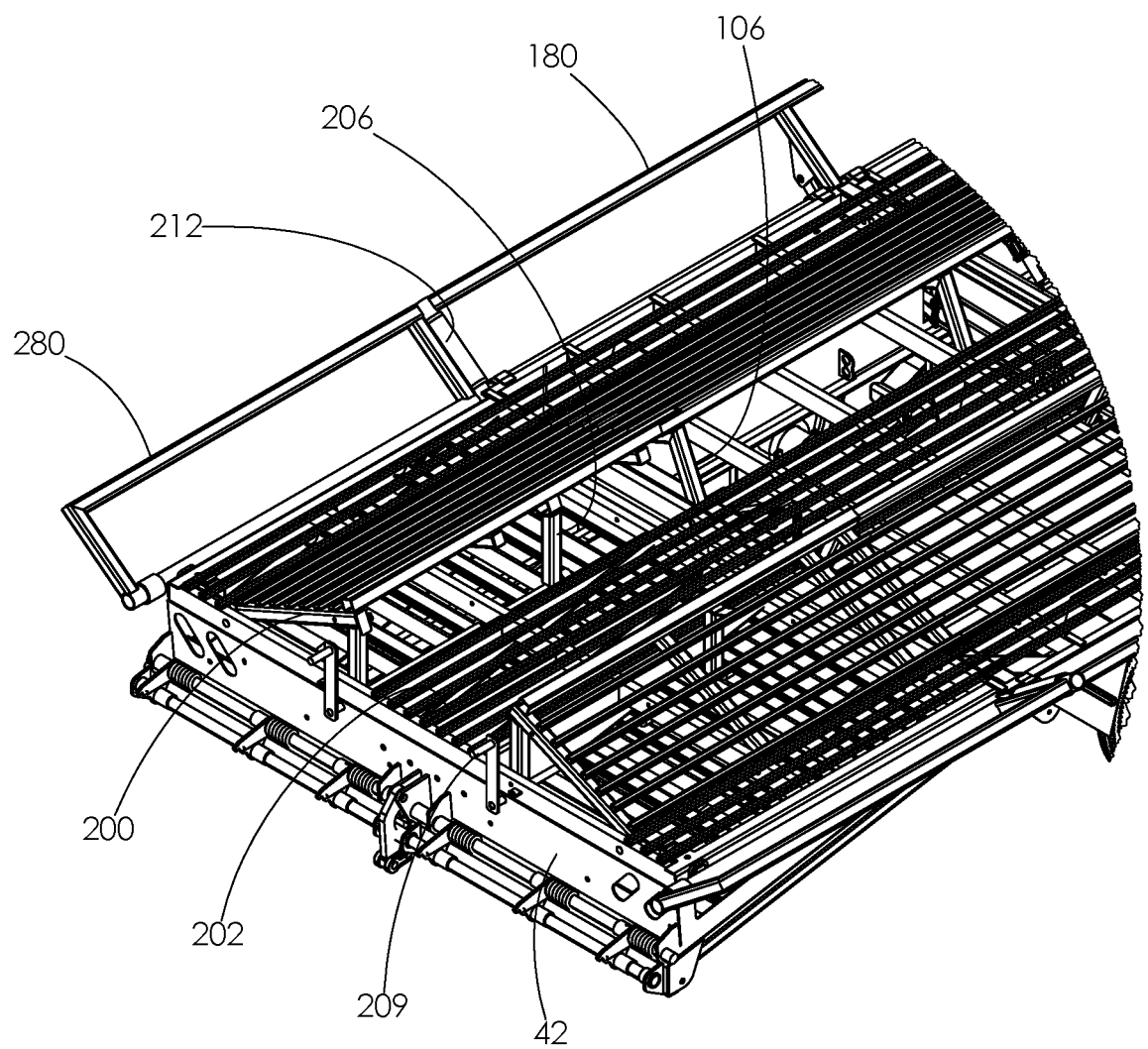
FIG. 27 is a top right rear perspective view of FIG. 13, with the rear ramp section of the trailer in the second configuration.
Figure 28:
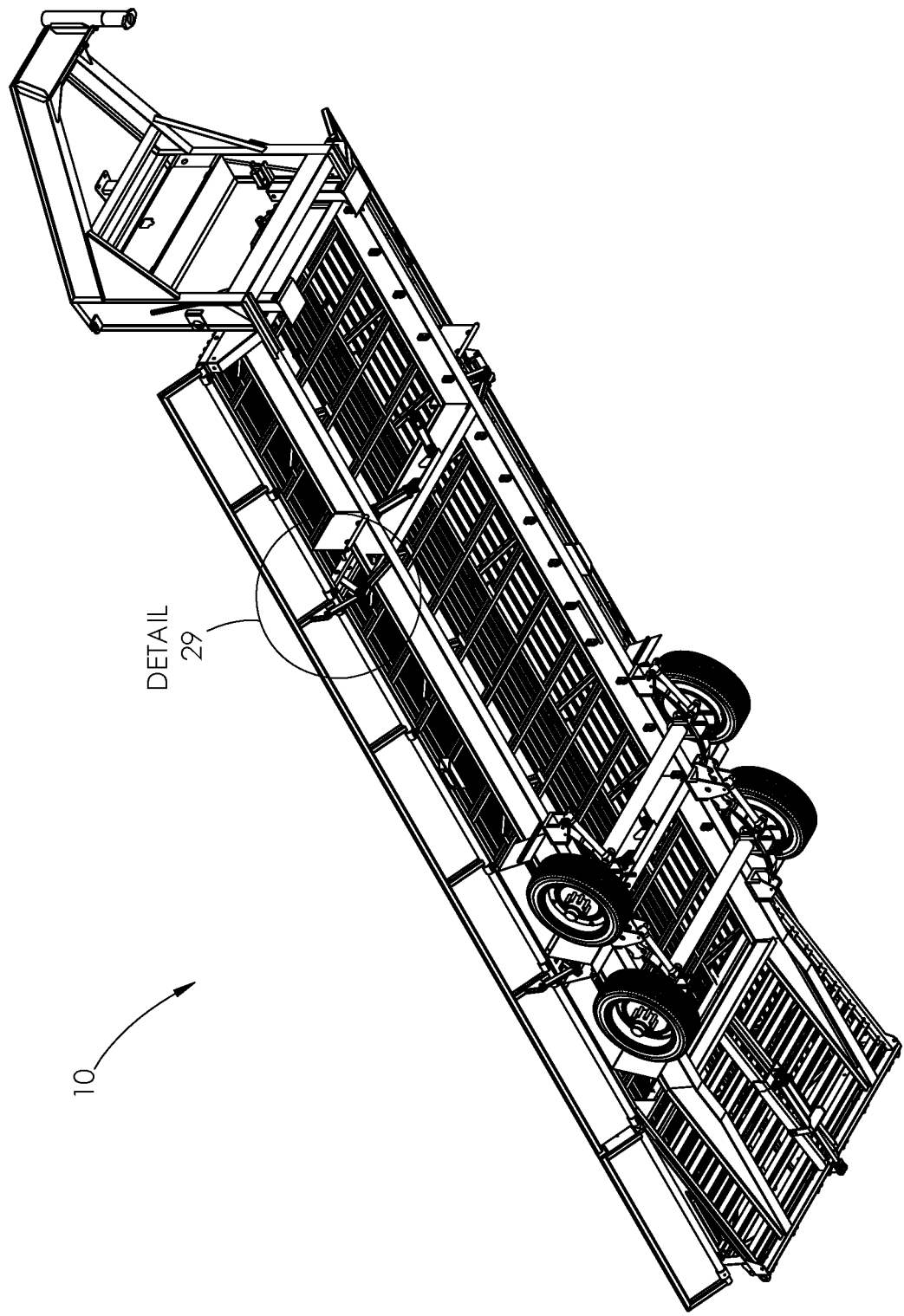
FIG. 28 is a front bottom right view of the trailer in its second configuration. Details 29 and 30 are found in FIG. 28.

As shown in FIG. 23 and FIG. 27, the rear ramp apparatus 22 may be adjusted to match the configuration of the front deck section 20. The rear ramp apparatus comprises one or more movable sections 200 and an immovable section 202. The movable section 200 may be tilted by a cylinder or may, due to its smaller size, be capable of being lifted by an operator. A rod 208 (FIG. 24) is attached to a handle 209 and situated beneath each movable section 200. Each rod 208 is attached to one or more supports 206 which rotate into a position, as the handle 209 is rotated, to engage a bottom surface of the movable section 200. A locking mechanism may be used to lock the rod 208 in place, so that the rod 208 does not rotate during operation, causing the movable section 200 to collapse.

Alternatively, the supports 206 could be integral with the movable section 200 and platforms incorporated on the rod 208 as in the front deck section. However, due to space limitations associated with the rear ramp apparatus 22 generally, and the flip over ramp 42 in particular, the shown embodiment is favored. Further, the rod 208 may be actuated by a hydraulic or mechanical tool rather than manually.

The side rail 80 has a first section 180 which runs along each side of the front deck section 20, and a second section 280 which runs along each side of the rear ramp apparatus 22. The second section 280 and first section 180 are attached at a pivot joint 212 that is located proximate the attachment of the front deck section 20 and transition section 40. The second section 280 is thus pivotal relative to the first section 180 about the pivot joint 212. The pivot joint 212 is vertical when the side rail 80 is at a right angle to a flat decking surface 30, but pivots relative to the base 84 as described above due to the operation of the rail actuator 86.

The side rail 80, at its second section 280, attaches at its second end 82 to the flip over ramp 42. The second section 280 may have a tab 214 which extends into a slot 216 within the flip over ramp 42. The tab 214 may be secured in the slot 216 by a pin.

As shown in FIGS. 17-19 and 26, the second section 280 should be disconnected from the flip over ramp 42 when it is deployed to contact the ground surface. The second section 280 may also be disconnected and pivoted at 90 degrees about the pivot joint 212 to allow for additional clearance. This may help, for example, when a large vehicle is being loaded on the flip over ramp 42.

In operation, the trailer 10 is operable in at least three basic configurations. In the first configuration, the decking 30 of the first deck section 20 is flat, the flip over ramp 42 is stowed such that its ramp surface 76 is in face-to-face relationship with the transition portion 40, and the movable sections 200 of the rear ramp apparatus 22 are flat. In this configuration, the trailer 10 operates as a flat bed, suitable for moving machinery, equipment, square bales, and other material that does not tend to move on a flat surface.

The first configuration will typically include the side rails 80 in the upright position, as in FIG. 1, or in the fully down position, as in FIG. 7. The rails 80 may be fully down when clearance is needed along the sides of the bed, or fully up when additional side-to-side stability is desired.

In the second configuration, the movable section 100 and movable section 200 are raised and secured, as shown best in FIGS. 12-16. The side rails 80 may be pivoted outwards from the trailer 10. The resulting cradle formed between the movable sections 100, 200, and the corresponding sections of side rails 180, 280 is suitable for the storage and transportation of round hay bales. The use of the movable sections 200 on the flip over ramp 42 provides additional round bale storage unavailable in previous trailers.

In the second configuration, it may be desired to offload the hay bales in a single location. To offload a particular side of the trailer 10, the side rail 80 on that side is rotated by operation of the rail actuator 86 until the side rail 80 is below horizontal. Bales will then fall from the side of the trailer 10 as dictated by gravity and the slope of the movable sections 100, 200.

A third configuration is shown in FIGS. 18-22. In this configuration, the flip over ramp 42 is deployed such that the flip over ramp's ramp surface 76 and the transition portion 40 cooperate to form a ramp which extends to the decking material 30 of the front deck section 20 of the trailer 10.

Figure 18:
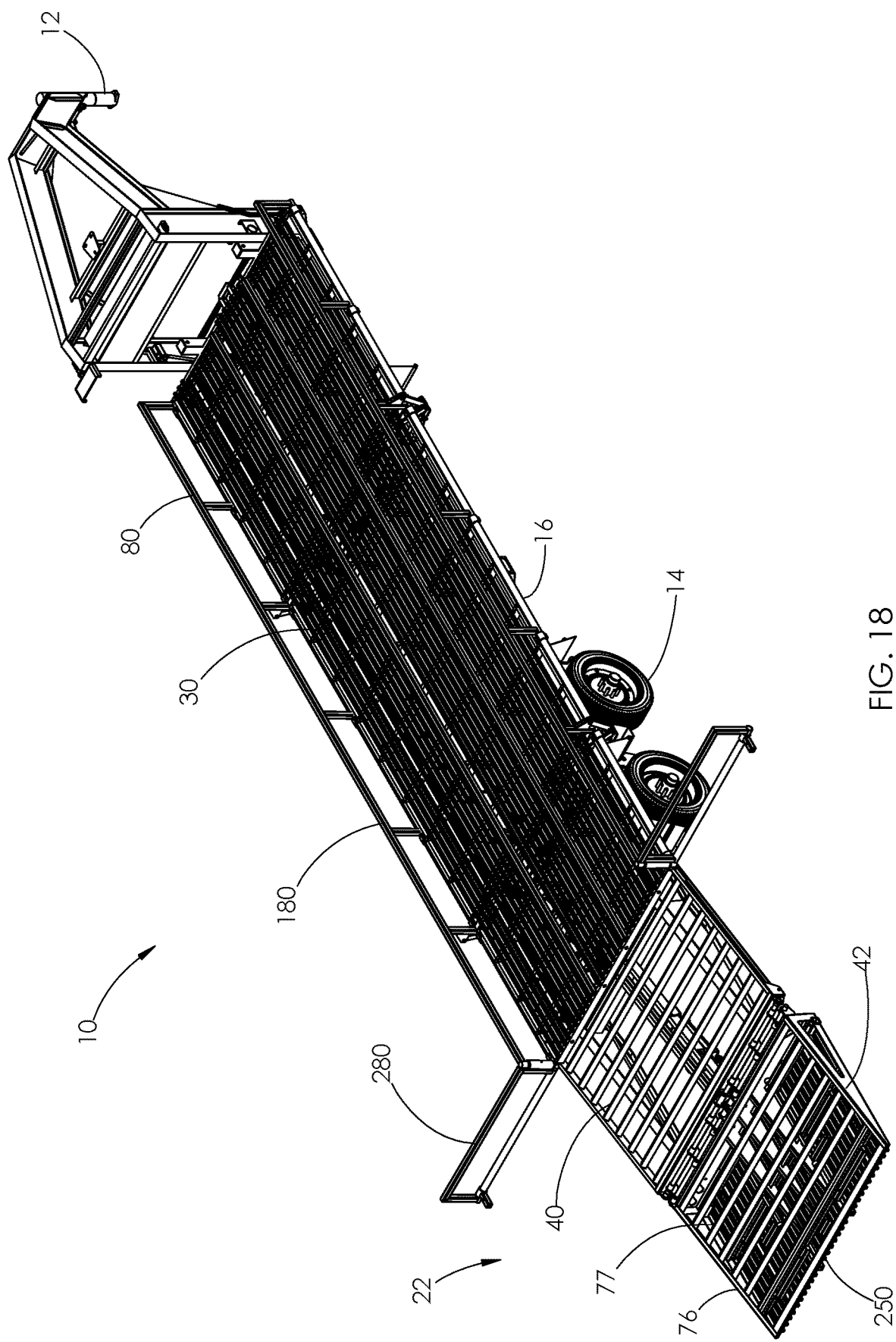
FIG. 18 is a right rear perspective view thereof.
Figure 19:
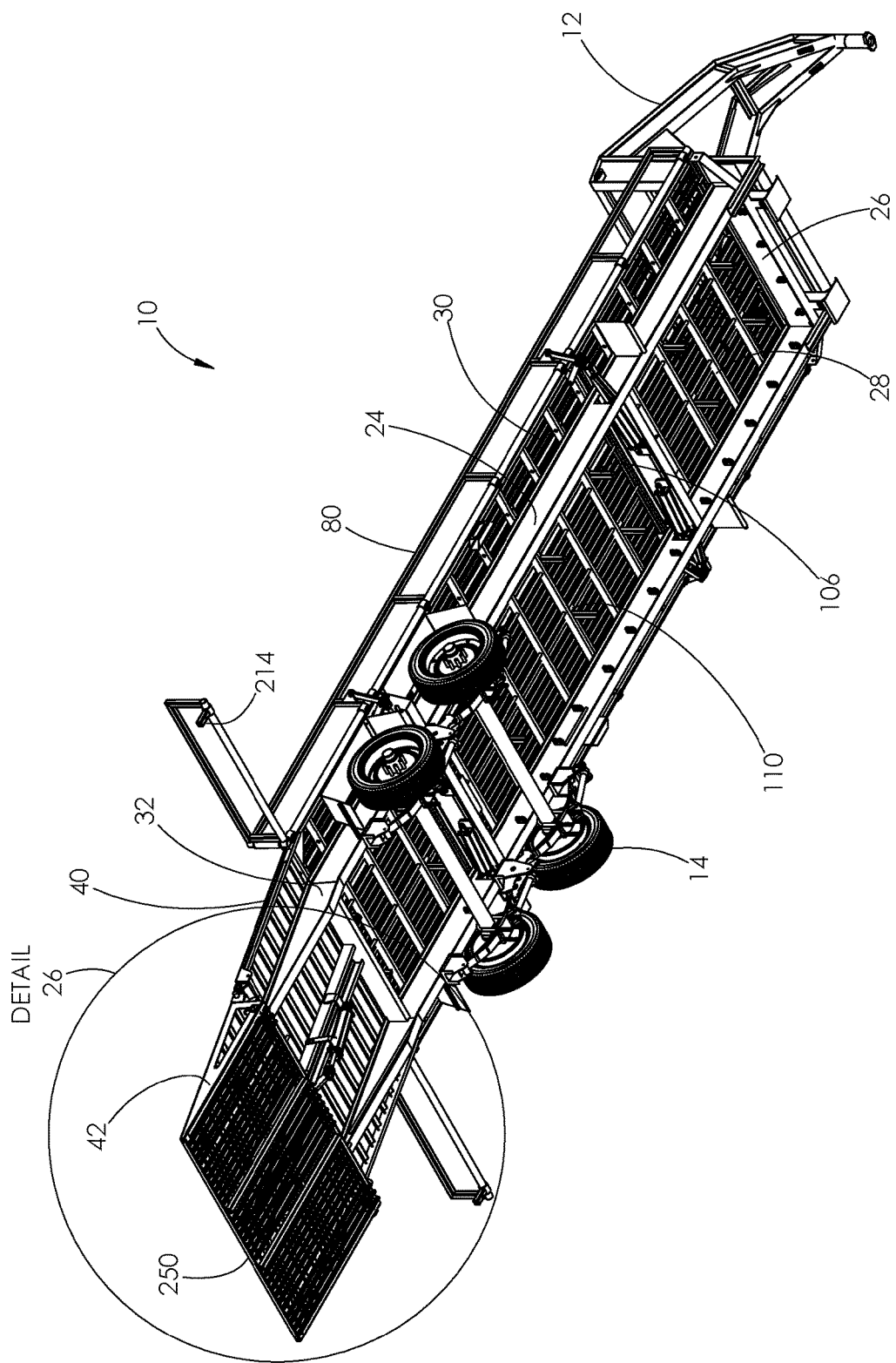
FIG. 19 is a right rear bottom perspective view thereof. Detail 26 is taken from this figure. Portions of the frame of the vehicle are exposed, including the mechanism for deploying the flip over ramp.

In the third configuration, the side rails 80 may be upright as in FIGS. 17 and 18, or may be fully lowered, but in either case, the second section 280 of the side rails 80 must be disconnected from the flip over ramp 42. It may be preferable to pivot the second section 280 away from the rear ramp apparatus 22, so that a wide vehicle will not be impeded by the side rails 80.

While the trailer 10 described above has separate actuation for the front section 20 and rear ramp section 22, a link may be utilized to synchronize the lifting and lowering of the movable sections 100, 200. For example, a bar or strap can extend selectively extend between the rear ramp section 22 and front section 20, tying the pivoting of the movable sections 100, 200 together. One such mechanism would be a rod, capable of being pinned to the decking or trusses of both the front section 20 and rear ramp section 22. When pinned to both sections, the rod would couple the movable sections 100, 200 together. When not pinned (or pinned to only one section), the movable sections 100, 200 would move independently. It should be appreciated that such a coupling device must not be connected to the front 20 and rear ramp 22 sections when the flip over ramp 42 is being deployed.

Variations may be made in the scope of this invention without departing from its spirit. The depicted embodiments are not to be construed as a limitation on the invention, and are merely illustrative thereof.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

What is claimed is:

1. A trailer, comprising:
   a front section having one or more deck sections, the front section being convertible between a first condition of the front section, in which the one or more deck sections form a generally flat surface, and a second condition of the front section, in which the one or more deck sections form a cradle for support of a load; and
   a rear section, having a first, a second, and a third condition, the rear section comprising:
      one or more deck sections supported by a first frame;
      a pair of side rails attached to the front section;
      a ramp extending from the front section; and
      a hinge interconnecting the ramp and the first frame; and
   wherein:
      the first condition of the rear section is defined by the deck sections of the rear section being generally flat and oriented to conform to the front section when the front section is in the first condition of the front section;
      the second condition is defined by the deck sections of the rear section being oriented to form a cradle adjacent to the cradle formed by the front section when the front section is in the second condition; and
      the third condition is defined by the first frame being pivoted about the hinge, such that the ramp is not below the deck sections of the rear section.

2. The trailer of claim 1 in which the one or more side rails are rotatably attached to the first frame at a first end and removably attached to the first frame at a second end.

3. The trailer of claim 1 in which the one or more side rails have a length and pivot about an axis parallel to the length.

4. The trailer of claim 1 in which the rear section comprises a plurality of support structures, in which the plurality of support structures are rotatable relative to the first frame and alignable such that the support structures maintain the one or more deck sections in the second condition.

5. The trailer of claim 1 wherein the side rails are characterized as rear side rails and in which the front section further comprises:
   a pair of front side rails extending along opposing sides of the one or more deck sections, of the front section, wherein one end of each of the pair of side rails is proximate a corresponding one of the rear side rails.

6. The trailer of claim 5 in which the pair of front side rails are movable from a substantially vertical position when the front section is in the first condition, to a non-vertical position when the front section is in the second condition.

7. The trailer of claim 6 wherein one of the pair of front side rails forms a portion of the cradle when in the second condition.

8. A ramp for a trailer comprising an adjustable deck having a first length, wherein the trailer is adjustable between a first and a second condition, the first condition being defined by the adjustable deck being substantially flat and the second condition being defined by a portion of the adjustable deck pivoting about a horizontal axis, the horizontal axis being disposed along the first length of the deck, the ramp comprising:
   a first frame section;

a second frame section having first and second ends, wherein the second frame section extends from the trailer at its first end, and defines a hinge axis at its second end, wherein the second frame section is connected to the first frame section at the hinge axis; and first and second side rails, each pivotally connected to the trailer about a rail axis and configured for selective attachment to the first frame section at an attachment point;

wherein:
the first frame section has a first surface;
the second frame section has a second surface; and
the first frame section has an adjustable surface, wherein the adjustable surface is pivotal about the horizontal axis; and
wherein the first surface and the adjustable surface meet at a first angle.

9. The ramp of claim 8, wherein the adjustable surface is comprised of spaced apart square tubing elements.

10. The ramp of claim 9 wherein the first surface and second surface are each comprised of spaced apart square tubing elements.

11. The ramp of claim 8, wherein:
the first frame section is configured to be placed in a first position, wherein the first position is defined by:
the first surface of the first frame section and the second surface of the second frame section being opposed; and
the adjustable surface is substantially coplanar with the adjustable deck of the trailer when the trailer is in the first condition.

12. The ramp of claim 11, wherein:
the first frame section is configured to be placed in a second position, wherein the second position is defined by:
the first surface of the first frame section and second surface of the second frame section being opposed; and
at least a portion of the adjustable surface is substantially coplanar with the portion of the adjustable deck when the adjustable deck is in the second condition, such that the adjustable deck and the adjustable surface form a continuous region.

13. The ramp of claim 12, wherein:
the first frame section is configured to be placed in a third position, wherein the third position is defined by:
the first surface of the first frame section being substantially coplanar with the second surface of the second frame section.

14. A method of adjusting the ramp of claim 13, comprising:
placing the adjustable deck in the first condition and the first frame section in the first position;
disconnecting the first side rail from the attachment point of the first side rail;
pivoting the first side rail about the rail axis and away from the attachment point;
disconnecting the second side rail from the attachment point of the second side rail;
pivoting the second side rail about the rail axis and away from the attachment point of the second side rail; and
rotating the first frame section about the hinge axis such that the first frame section is in the third position.

15. The ramp of claim 12, in which the first side rail is pivotal relative to a second rail axis, wherein the second rail axis is orthogonal to the rail axis.

16. A method of adjusting the ramp of claim 15, comprising:
placing the adjustable deck in the first condition and the first frame section in the first position;
pivoting the portion of the adjustable deck about the horizontal axis to the second condition;
pivoting the adjustable surface about the horizontal axis to the second position of the first frame section;
placing at least a first support bar to maintain the portion of the adjustable deck in the second condition;
placing at least a second support bar to maintain the adjustable surface in the second position; and
pivoting the first side rail about the horizontal axis such that the first side rail and the adjustable surface cooperate to form a concave cradle.

* * * * *

UNITED STATES PATENT AND TRADEMARK OFFICE
CERTIFICATE OF CORRECTION

| | |
|---|---|
| PATENT NO. | : 11,818,984 B2 |
| APPLICATION NO. | : 17/845605 |
| DATED | : November 21, 2023 |
| INVENTOR(S) | : John Magness |

It is certified that error appears in the above-identified patent and that said Letters Patent is hereby corrected as shown below:

In the Claims

Column 8, Claim 5, Line 49, please delete "," after the word "sections".

Signed and Sealed this
Second Day of January, 2024

*Katherine Kelly Vidal*

Katherine Kelly Vidal
*Director of the United States Patent and Trademark Office*